(12) United States Patent   (10) Patent No.: US 7,881,819 B2
Tasaka et al.   (45) Date of Patent: Feb. 1, 2011

(54) SUBSTRATE TRANSFER APPARATUS, METHOD OF TRANSFERRING SUBSTRATE, AND METHOD OF MANUFACTURING ELECTRO-OPTICAL DEVICE

(75) Inventors: Kazuo Tasaka, Eniwa (JP); Hirokazu Fujishima, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1088 days.

(21) Appl. No.: 11/368,883

(22) Filed: Mar. 6, 2006

(65) Prior Publication Data

US 2006/0219688 A1 Oct. 5, 2006

(30) Foreign Application Priority Data

Mar. 29, 2005 (JP) ............................. 2005-094766

(51) Int. Cl.
G06F 7/00 (2006.01)
(52) U.S. Cl. ...................................... 700/214; 414/217
(58) Field of Classification Search ................ 700/213, 700/214; 414/217, 805, 800, 804
See application file for complete search history.

(56) References Cited

U.S. PATENT DOCUMENTS

| | | | | |
|---|---|---|---|---|
| 6,253,118 | B1 * | 6/2001 | Koyama | ...................... 700/218 |
| 2002/0044860 | A1 * | 4/2002 | Hayashi et al. | ......... 414/416.03 |
| 2002/0182040 | A1 * | 12/2002 | Kimura et al. | .......... 414/331.04 |
| 2003/0091410 | A1 * | 5/2003 | Larson et al. | ............... 414/217 |
| 2003/0180127 | A1 * | 9/2003 | Kuroda | ........................ 414/217 |
| 2004/0013499 | A1 * | 1/2004 | Cho et al. | .................... 414/217 |

FOREIGN PATENT DOCUMENTS

JP 09-040111 A 2/1997
JP 2003-015543 A 1/2003

* cited by examiner

*Primary Examiner*—Gene Crawford
*Assistant Examiner*—Ramya Prakasam
(74) *Attorney, Agent, or Firm*—AdvantEdge Law Group, LLC

(57) ABSTRACT

A substrate transfer apparatus transfers substrates stored in a first substrate storage case, which has support grooves in its inner wall, along the support grooves to substrate storage surfaces included in a second substrate storage case. The substrate transfer apparatus includes a first-substrate-storage-case placement section in which the first substrate storage case is placed, a second-substrate-storage-case placement section in which the second substrate storage case is placed, a substrate transfer mechanism that holds the substrates stored in the first substrate storage case so as to draw out the substrates from the first substrate storage case, and transfers the substrates to a substrate placement section of a substrate placing mechanism, a substrate holding mechanism that holds the substrates placed in the substrate placement section at hold positions, and discharges the substrates at discharge positions so as to dispose the substrates on the substrate storage surfaces of the second substrate storage case, and a transport mechanism that transports the substrate holding mechanism from the hold positions to the discharge positions.

11 Claims, 11 Drawing Sheets

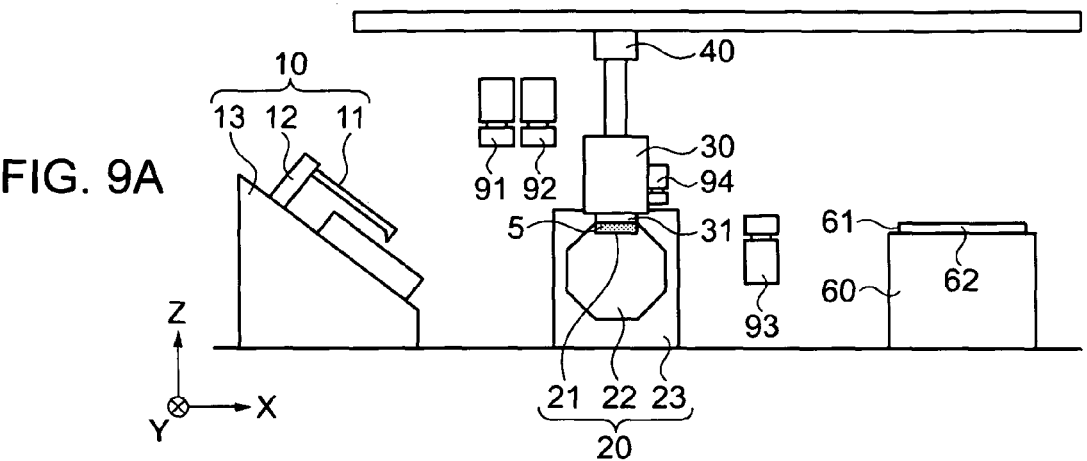
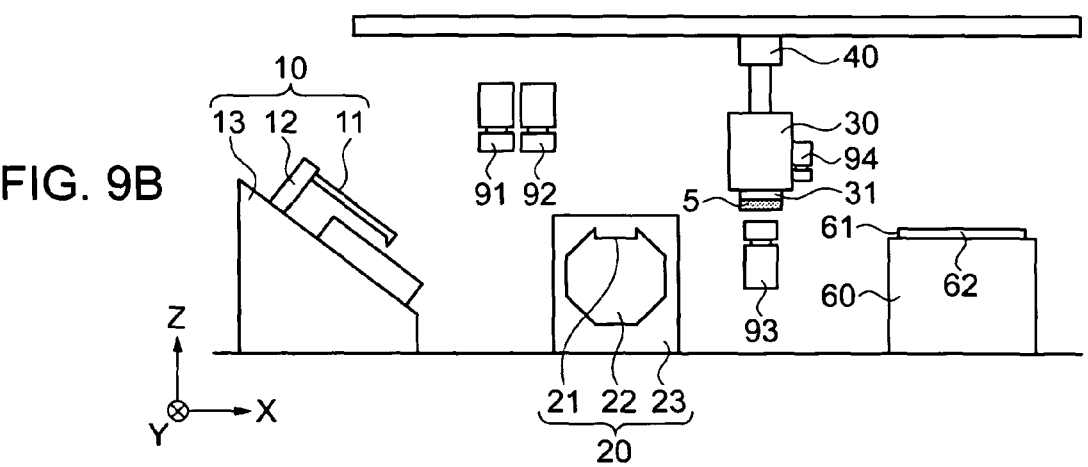
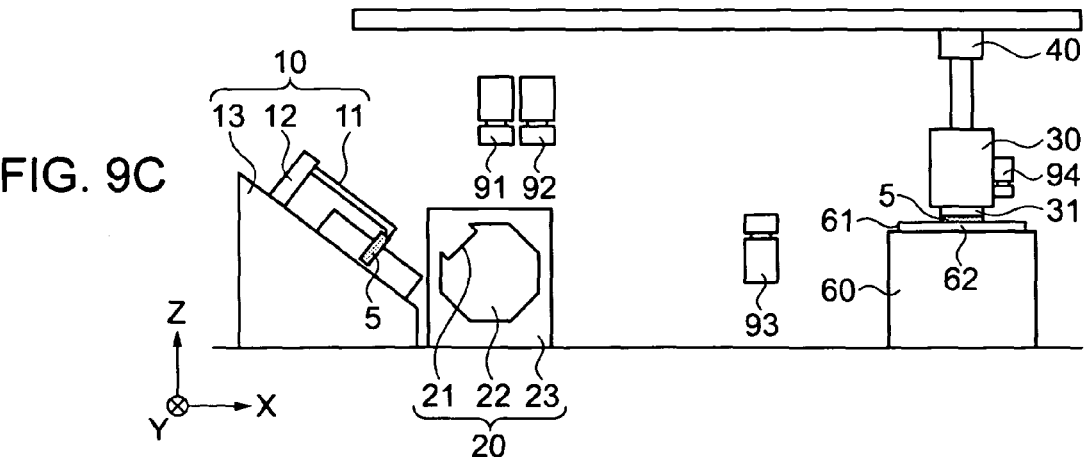

SUBSTRATE TRANSFER APPARATUS, METHOD OF TRANSFERRING SUBSTRATE, AND METHOD OF MANUFACTURING ELECTRO-OPTICAL DEVICE

BACKGROUND

1. Technical Field

The present invention relates to a substrate transfer apparatus which transfers substrates between substrate storage cases, to a method of transferring a substrate, and to a method of manufacturing an electro-optical device using the method of transferring a substrate.

2. Related Art

In general, a liquid crystal display device is manufactured such that a plurality of liquid crystal display devices are formed on a pair of glass substrates to cut out a single liquid crystal display device (hereinafter, referred to as a single product) from the glass substrates. The glass substrate, which is used in such a manufacturing method, has sides each having a length of several hundreds of millimeters or more.

On the other hand, the liquid crystal display device may be manufactured by bonding a plurality of counter glass substrates, each of which has a diagonal size of about two inches or less corresponding to the single product, to a large glass substrate in advance, and cutting out a single liquid crystal display device. This manufacturing method is performed in order to avoid a risk of miscombination at the time of bonding the counter glass substrates or to control a gap between the glass substrates with high precision. In this case, a method of manufacturing a liquid crystal display device has a process of transporting the counter glass substrates each having a size corresponding to the single product. As an example of such a process, a process of drawing out the counter glass substrates stored upright in a substrate storage case one by one and transferring the counter glass substrates to a different palette-shaped substrate storage case side by side can be exemplified.

However, an apparatus for transferring a small counter glass substrate, which can be applied to the above-described process, had not been suggested yet. At present, the counter glass substrates are transferred by human hands. There is a possibility for problems to occur when transferred by human hands, such as the substrate may be damaged, a transfer position may be misaligned, yield is lowered due to an error in a storage direction of the substrate or the like, the number of workers needed is increased, or it takes too much time for a worker to become proficient.

SUMMARY

According to a first aspect of the invention, a substrate transfer apparatus for transferring a substrate stored in a first substrate storage case, which has support grooves in its inner wall, along the support grooves to substrate storage surfaces included in a second substrate storage case includes a first-substrate-storage-case placement section in which the first substrate storage case is placed, a second-substrate-storage-case placement section in which the second substrate storage case is placed, a substrate transfer mechanism that holds the substrates stored in the first substrate storage case so as to draw out the substrates from the first substrate storage case, and transfers the substrates to a substrate placement section of a substrate placing mechanism, a substrate holding mechanism that holds the substrates placed in the substrate placement section at hold positions, and discharges the substrates at discharge positions so as to dispose the substrates onto the substrate storage surfaces of the second substrate storage case, and a transport mechanism that transports the substrate holding mechanism from the hold positions to the discharge positions.

In such a substrate transfer apparatus, after the substrate transfer mechanism transfers the substrates from the first substrate storage case to the substrate placement section, the substrate holding mechanism holds the substrates. Subsequently, in this state, the transport mechanism transports the substrate holding mechanism to the discharge positions. Finally, the substrate holding mechanism stores the substrates in the second substrate storage case. As such, as one of the effects to be obtained from this configuration, the substrates including glass substrates each having a diagonal size of two-inches or less can be transferred to the second substrate storage case from the first substrate storage case, without human hands.

In the substrate transfer apparatus according to the first aspect, the substrate placing mechanism may have a moving mechanism that moves the substrate placement section to a plurality of positions including a first position and a second position, and the substrates placed in the substrate placement section disposed at the first position may be substantially parallel to the substrates stored in the first substrate storage case on the first-substrate-storage-case placement section. According to this configuration, the substrates drawn out from the first substrate storage case by the substrate transfer mechanism are substantially parallel to the substrate placement section disposed at the first position. Accordingly, it is not necessary to adjust the angles of the substrates at the time of transferring the substrates, and thus transferring of the substrates can be easily performed. Further, according to the above-described configuration, the substrates are stored in the first substrate storage case in a state of being inclined with respect to a vertical plane. Accordingly, the substrates lean against the support grooves by self-weight to have stable postures. Further, if the support grooves are arranged at constant intervals, the substrates are disposed at constant intervals. For this reason, the substrate transfer mechanism can easily hold the substrates.

In the substrate transfer apparatus according to the first aspect of the invention, the substrates placed in the substrate placement section disposed at the second position may be substantially parallel to the substrate storage surfaces included in the second substrate storage case, and the substrate holding mechanism may hold, at the hold positions, the substrates placed in the substrate placement section disposed at the second position. According to this configuration, the substrate holding mechanism can hold the substrates with good balance and can store the substrates on the substrate storage surfaces included in the second substrate storage case by parallel moving the substrates.

In the substrate transfer apparatus according to the first aspect of the invention, preferably, the moving mechanism has a rotating mechanism that rotates a part including the substrate placement section around a substantially horizontal axis. By using the rotating mechanism, the moving mechanism can easily move the substrate placement section between the first position where the placed substrates are inclined from horizontal states and the second position where the placed substrates are substantially in the horizontal states.

In the substrate transfer apparatus according to the first aspect of the invention, the substrate holding mechanism may have an absorbing mechanism that absorbs and holds the substrates. According to this configuration, the substrate holding mechanism can absorb one plane of each substrate, such that the substrate can be held in a state in which an end surface of the substrate is free. The free state indicates that the end surface of the substrate does not come into contact with any foreign substances. If all end surfaces of the substrate are free, even when the second substrate storage case has partition walls guiding the end surfaces of the substrate, the substrate holding mechanism can easily discharge the substrate to the second substrate storage case.

In the substrate transfer apparatus according to the first aspect of the invention, the substrate holding mechanism may have a rotating unit that rotates the absorbing mechanism around a substantial vertical axis. Such a substrate holding mechanism can rotate the substrates around the vertical axis in a state in which the substrates are absorbed by the absorbing mechanism. Accordingly, the substrate transfer apparatus can transfer the substrates along the partition walls of the substrate storage surfaces.

The substrate transfer apparatus according to the first aspect of the invention may further include a first detecting mechanism that detects the direction of the substrate placed in the substrate placement section. In the substrate transfer apparatus having this configuration, when the first detecting mechanism detects that the direction of the substrate placed in the substrate placement section is rotated by 180 degrees from a predetermined state in the same plane, for example, the direction of the substrate can be corrected to the predetermined state by causing the substrate holding mechanism to rotate the absorbing mechanism, which holds the substrate, by 180 degrees, and then the substrate can be transferred. Further, in the substrate transfer apparatus, when the first detecting mechanism detects that the substrate placed in the substrate placement section is turned over from the predetermined state, for example, by stopping the apparatus, the substrate can be prevented from being transferred in a state of being turned over.

The substrate transfer apparatus according to the first aspect of the invention may further include a second detecting mechanism that detects damages of the substrates placed in the substrate placement section. In the substrate transfer apparatus having this configuration, when the second detecting mechanism detects that the substrate is damaged, for example, by stopping the apparatus, the damaged substrate can be prevented from being transferred.

The substrate transfer apparatus according to the first aspect of the invention may further include a third detecting mechanism that detects positions of end surfaces of the substrates held by the substrate holding mechanism, a fourth detecting mechanism that detects positions of partition walls of the substrate storage surfaces provided in the second substrate storage case, and a processing unit that calculates the discharge positions from the positions of the end surfaces detected by the third detecting mechanism and the positions of the partition walls detected by the fourth detecting mechanism, and transmits information of the discharge positions to the transport mechanism. In the substrate transfer apparatus having this configuration, by calculating the discharge positions of the substrates from the positions of the end surfaces of the substrates held by the substrate holding mechanism and the positions of the partition walls of the second substrate storage case in advance, the substrates can be stored on the substrate storage surfaces with high precision.

According to a second aspect of the invention, a substrate transfer apparatus for transferring substrates stored on substrate storage surfaces included in a second substrate storage case to a first substrate storage case, which has support grooves in its inner wall, includes a second-substrate-storage-case placement section in which the second substrate storage case is placed, a first-substrate-storage-case placement section in which the first substrate storage case is placed, a substrate holding mechanism that holds the substrates placed on the substrate storage surfaces of the second substrate storage case at hold positions, and discharges the substrates at discharge positions so as to dispose the substrates in a substrate placement section of a substrate placing mechanism, a transport mechanism that transports the substrate holding mechanism from the hold positions to the discharge positions, and a substrate transfer mechanism that holds the substrates placed in the substrate placement section, and transfers the substrates to the first substrate storage case. As one of the effects obtained from this configuration, the substrates can be transferred in a direction opposite to the above-described direction. Specifically, the substrates can be transferred from the substrate storage surfaces included in the second substrate storage case to the first substrate storage case.

According to a third aspect of the invention, there is provided a method of transferring a substrate stored in a first substrate storage case, which has support grooves in its inner wall, along the support grooves to substrate storage surfaces included in a second substrate storage case. The method of transferring a substrate includes causing a substrate transfer mechanism to hold the substrates stored in the first substrate storage case on a first-substrate-storage-case placement section so as to draw out the substrates from the first substrate storage case, and to transfer the substrates to a substrate placement section of a substrate placing mechanism, causing a substrate holding mechanism to hold the substrates placed in the substrate placement section at hold positions, causing a transport mechanism to transport the substrate holding mechanism from the hold positions to discharge positions, and causing the substrate holding mechanism to discharge the substrates at the discharge positions and to dispose the substrates onto the substrate storage surfaces of the second substrate storage case placed in a second-substrate-storage-case placement section.

As one of the effects obtained from the above-described method, the substrates including glass substrates each having a diagonal size of two inches or less can be transferred from the first substrate storage case to the second substrate storage case, without human hands.

The method for transferring a substrate according to the third aspect of the invention may further include, prior to the causing the substrate transfer mechanism to hold and transfer the substrates, causing a moving mechanism included in the substrate placing mechanism to move the substrate placement section to the first position. In this case, the substrates placed in the substrate placement section disposed at the first position may be substantially parallel to the substrates stored in the first substrate storage case on the first-substrate-storage-case placement section. According to this method, the substrates drawn out from the first substrate storage case by the substrate transfer mechanism are substantially parallel to the substrate placement section disposed at the first position. Accordingly, it is not necessary to adjust the angles of the substrates at the time of transferring the substrates, such that transferring of the substrates can be easily performed. Further, according to the above-described method, the substrates are stored in the first substrate storage case in a state of being inclined with respect to the vertical plane. Accordingly, the substrates lean against the support grooves by self-weight to have stable postures. Further, if the support grooves are arranged at constant intervals, the substrates are disposed at constant intervals. For this reason, the substrate transfer mechanism can easily hold the substrates.

The method of transferring a substrate according to the third aspect of the invention may further include, after the causing the substrate transfer mechanism to hold and transfer the substrates, causing a moving mechanism included in the substrate placing mechanism to move the substrate placement section to the second position. Further, the causing the substrate holding mechanism to hold the substrates may have causing the substrate holding mechanism to hold, at the hold positions, the substrates placed in the substrate placement section disposed at the second position. In this case, the substrates placed in the substrate placement section disposed at the second position may be substantially parallel to the substrate storage surfaces included in the second substrate storage case. According to this method, the substrate holding mechanism can hold the substrates with good balance and can store the substrates on the substrate storage surfaces included in the second substrate storage case by parallel moving the substrates.

In the method of transferring a substrate according to the third aspect of the invention, it is preferable that, in the causing the moving mechanism to move the substrate placement section to the first position or in the causing the moving mechanism to move the substrate placement section to the second position, the moving mechanism having a rotating mechanism for rotating a part including the substrate placement section around a substantial horizontal axis move the substrate placement section. Due to the rotating mechanism, the moving mechanism can easily move the substrate placement section between the first position where the placed substrates are inclined from the horizontal states and the second position where the placed substrates are substantially in the horizontal states.

In the method of transferring a substrate according to the third aspect of the invention, the causing the substrate holding mechanism to hold the substrates may have causing the substrate holding mechanism to absorb and hold the substrates. According to this method, the substrate holding mechanism can absorb and hold one plane of each substrate, such that the substrate can be held in a state in which an end surface of the substrate is free. If all end surfaces of the substrate are free, even when the second substrate storage case has partition walls guiding the end surfaces of the substrate, the substrate holding mechanism can easily discharge the substrate to the second substrate storage case.

The method of transferring a substrate according to the third aspect of the invention may further include, after the causing the substrate transfer mechanism to hold and transfer the substrates, causing a first detecting mechanism to detect the directions of the substrates placed in the substrate placement section. According to this method of transferring a substrate, when the first detecting mechanism detects that the direction of the substrate placed in the substrate placement section is rotated by 180 degrees from a predetermined state in the same plane, for example, the direction of the substrate can be corrected to the predetermined state by causing the substrate holding mechanism to rotate the absorbing mechanism, which holds the substrate, by 180 degrees, and then the substrate can be transferred. In addition, according to this method of transferring a substrate, when the first detecting mechanism detects that the substrate placed in the substrate placement section is turned over from the predetermined state, for example, by stopping the apparatus, the substrate can be prevented from being transferred in a state of being turned over.

The method of transferring a substrate according to the third aspect of the invention may further include, after the causing the substrate transfer mechanism to hold and transfer the substrates, causing a second detecting mechanism to detect damages of the substrates placed in the substrate placement section. According to this method of transferring a substrate, when the second detecting mechanism detects that the substrate is damaged, for example, by stopping the apparatus, the damaged substrate can be prevented from being transferred.

The method of transferring a substrate according to the third aspect of the invention may further include, after the causing the substrate holding mechanism to hold the substrates, causing a third detecting mechanism to detect positions of end surfaces of the substrates held by the substrate holding mechanism, after the causing the third detecting mechanism to detect the positions of the end surfaces of the substrates, causing a fourth detecting mechanism to detect positions of partition walls of the substrate storage surfaces provided in the second substrate storage case, and, after the causing the fourth detecting mechanism to detect the positions of the partition walls of the substrate storage surfaces, causing a processing unit to calculate the discharge positions from the positions of the end surfaces detected by the third detecting mechanism and the positions of the partition walls detected by the fourth detecting mechanism, and to transmit information of the discharge positions to the transport mechanism. According to this method of transferring a substrate, by calculating the discharge positions of the substrates from the positions of the end surfaces of the substrates held by the substrate holding mechanism and the positions of the partition walls of the second substrate storage case in advance, the substrates can be stored on the substrate storage surfaces with high precision.

According to a fourth aspect of the invention, there is provided a method of transferring substrates stored on substrate storage surfaces included in a second substrate storage case to a first substrate storage case, which has support grooves in its inner wall. The method of transferring substrates includes causing a substrate holding mechanism to hold the substrates stored on the substrate storage surfaces included in the second substrate storage case on a second-substrate-storage-case placement section at hold positions, causing a transport mechanism to transport the substrate holding mechanism from the hold positions to discharge positions, causing the substrate holding mechanism to discharge the substrates at the discharge positions and to place the substrates in a substrate placement section of a substrate placing mechanism, and causing a substrate transfer mechanism to hold the substrate placed in the substrate placement section and to transfer the substrates to the first substrate storage case placed in a first-substrate-storage-case placement section. As one of the effects obtained from this method, the substrates can be transferred in a direction opposite to the above-described direction. Specifically, the substrates can be transferred from the substrate storage surfaces included in the second substrate storage case to the first substrate storage case.

According to a fifth aspect of the invention, there is provided a method of manufacturing an electro-optical device by transferring a substrate in a first substrate storage case, which has support grooves in its inner wall, along the support grooves to substrate storage surfaces included in a second substrate storage case. The method of manufacturing an electro-optical device includes causing a substrate transfer mechanism to hold the substrates stored in the first substrate storage case on a first-substrate-storage-case placement section so as to draw out the substrates from the first substrate storage case, and to transfer the substrates to a substrate placement section of a substrate placing mechanism, causing a substrate holding mechanism to hold the substrates placed in the substrate placement section at hold positions, causing a transport mechanism to transport the substrate holding mechanism from the hold positions to discharge positions, and causing the substrate holding mechanism to discharge the substrates at the discharge positions and to dispose the substrates onto the substrate storage surfaces of the second substrate storage case placed in a second-substrate-storage-case placement section. This method has a method of transferring a substrate which can transfer the substrates, without human hands, and thus the electro-optical device can be manufactured with high yield.

BRIEF DESCRIPTION OF THE DRAWINGS

The invention will be described with reference to the accompanying drawings, wherein like numbers reference like elements.

FIG. 9A is a schematic view showing a method of transferring a substrate according to an embodiment of the invention.

FIG. 9B is a schematic view showing a method of transferring a substrate according to an embodiment of the invention.

FIG. 9C is a schematic view showing a method of transferring a substrate according to an embodiment of the invention.

DESCRIPTION OF EXEMPLARY EMBODIMENTS

A. Configuration of Substrate Transfer Apparatus

Figure 1:
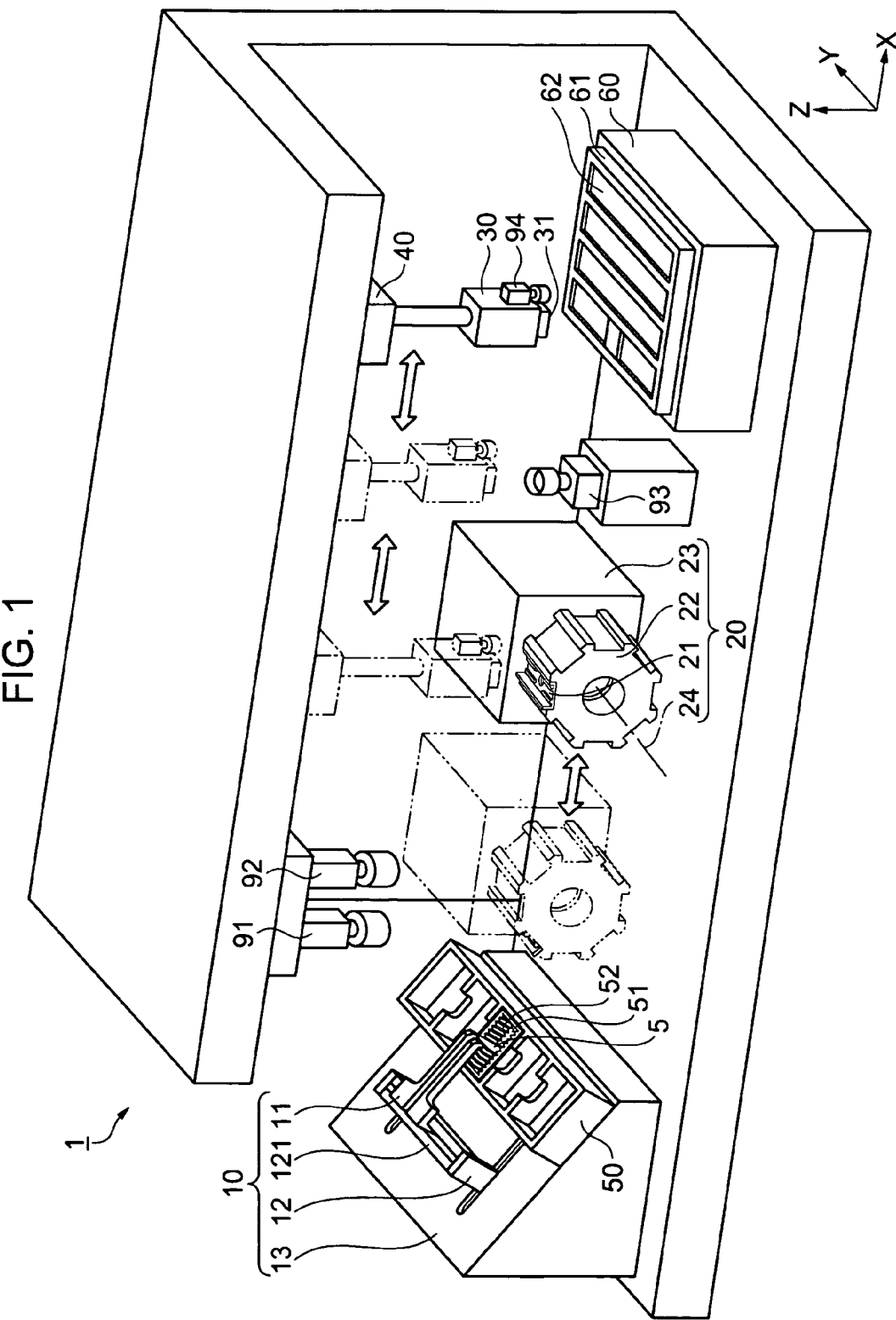
FIG. 1 is a schematic view showing a substrate transfer apparatus.

FIG. 1 is a schematic view showing the configuration of a substrate transfer apparatus 1 according to this embodiment. The substrate transfer apparatus 1 has a substrate transfer mechanism 10, a substrate-storage-case placement section 50 serving as 'first-substrate-storage-case placement section', a rotary pocket 20 serving as 'substrate placing mechanism', a substrate holding mechanism 30, a transport mechanism 40, cameras 91, 92, 93, and 94, and a palette placement section 60 serving as 'second-substrate-storage-case placement section'. The substrate transfer apparatus 1 is an apparatus which transfers glass substrates 5 serving as 'substrate' in a substrate storage case 51 placed in the substrate-storage-case placement section 50 to a palette 61 placed in the palette placement section 60. Hereinafter, a direction from the substrate storage case 51 toward the palette 61 in a horizontal plane, that is, a direction in which the glass substrates 5 are transferred, is referred to as an X axis, a direction perpendicular to the X axis on the horizontal plane is referred to as a Y axis, and a vertical upward direction is referred to as a Z axis. Hereinafter, the above-described parts will be described with reference to FIG. 1.

A1. Substrate Transfer Mechanism

A substrate transfer mechanism 10 has a hand 11, a hand moving mechanism 12, and a hand moving mechanism base section 13. In the hand moving mechanism base section 13, the substrate-storage-case placement section 50, in which the substrate storage case 51 is placed, is provided. The substrate-storage-case placement section 50 has a shape in which a plurality of containers configured to place the substrate storage case 51 are connected. In the substrate storage case 51, the glass substrates 5, which are to be transferred by the substrate transfer apparatus 1, are stored.

Figure 2:
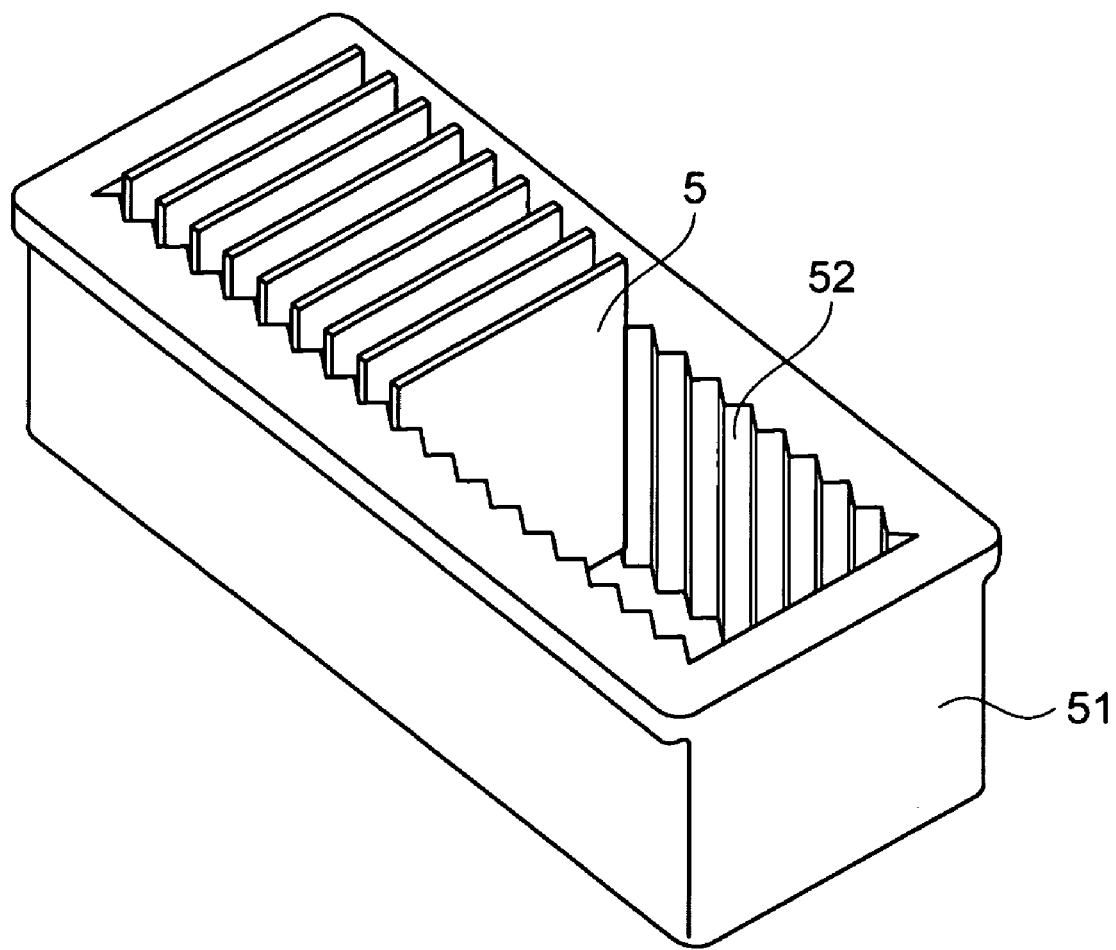
FIG. 2 is a schematic perspective view showing a first substrate storage case.

FIG. 2 is a schematic perspective view of the substrate storage case 51. The substrate storage case 51 is a plastic container which has support grooves 52 formed at constant intervals so as to support the glass substrates 5 in its inner wall. In the substrate storage case 51, the glass substrates 5 are arranged and stored in a direction along the support grooves 52.

Figure 11A:
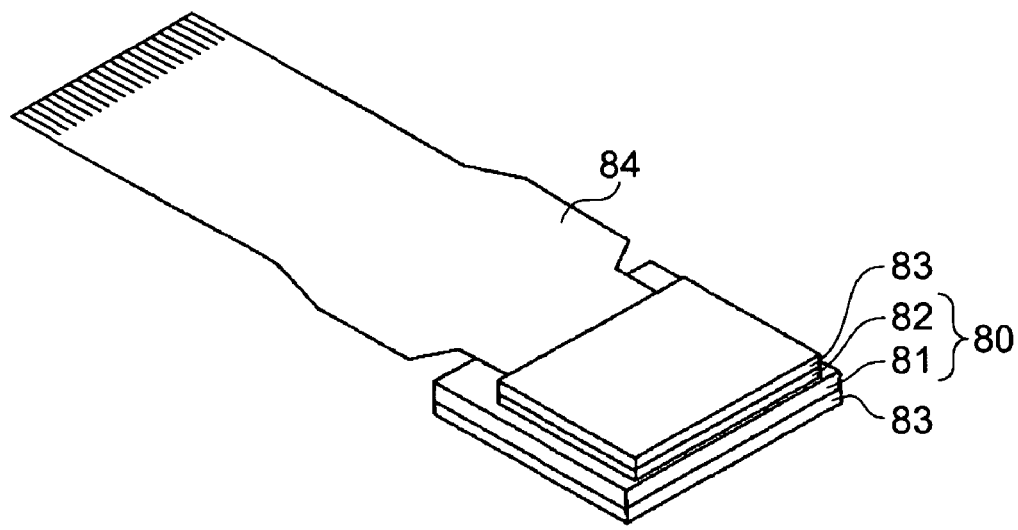
FIG. 11A is a schematic view of a liquid crystal display device.
Figure 11B:
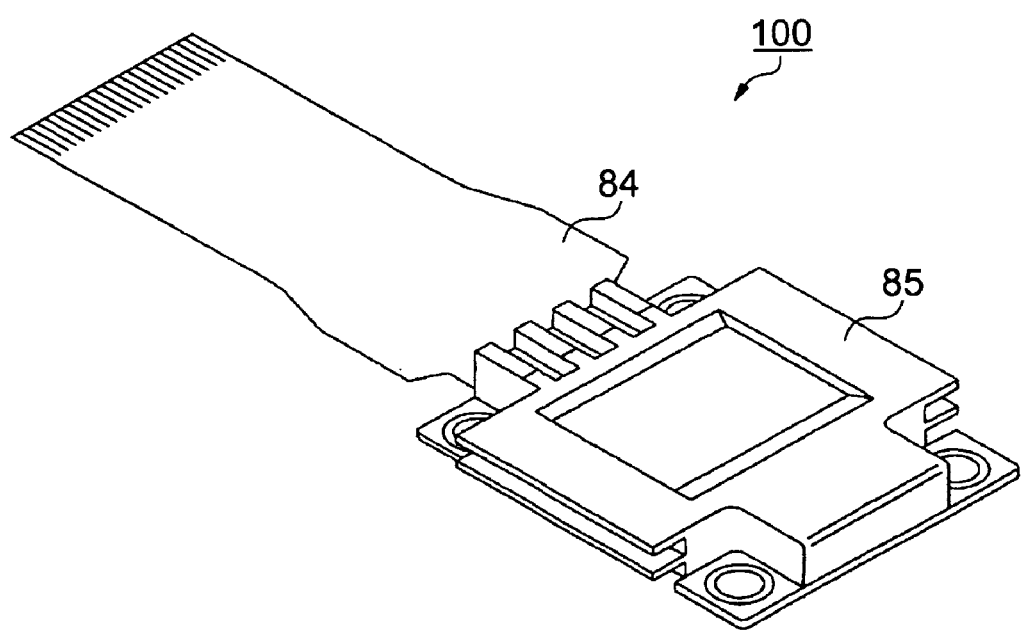
FIG. 11B is a schematic view of a liquid crystal display device.

Here, each glass substrate 5 is a member which constitutes a counter substrate 82 (see FIG. 11A) of a liquid crystal display device 100 (see FIG. 11B). On one surface of the glass substrate 5, excluding an outer edge, transparent electrodes and an alignment film coated to overlap the transparent electrodes are formed. At one point close to the outer edge of the glass substrate 5, a mark for judging a direction thereof is given. Further, the glass substrate 5 has a rectangular surface having a diagonal size of 1.3 inches, and has a thickness of 1.1 mm.

Of the hand moving mechanism base section 13, a surface on which the substrate-storage-case placement section 50 is provided is an inclined surface which is inclined by a predetermined angle from the horizontal plane. Accordingly, the substrate-storage-case placement section 50 and the substrate storage case 51 are also provided at the angle with respect to the horizontal plane. At this time, the glass substrate 5 is stored in a state of being inclined with respect to a vertical plane in the substrate storage case 51 and leans against the support groove 52 by its weight, such that the glass substrate 5 has a stable posture. As a result, all glass substrates 5 leans against the support grooves 52, and thus the glass substrates are stored in the substrate storage case 51 at constant intervals.

The above-described parts of the substrate transfer mechanism 10 are assembled to one another as follows. The hand moving mechanism 12 is mounted on the hand moving mechanism base section 13, and the hand 11 is mounted on the hand moving mechanism 12. Among these, the hand moving mechanism 12 has an arm portion 121. The hand moving mechanism 12 has a movable range in an ascending and descending direction of the inclined surface of the hand moving mechanism base section 13, and has a movable range in a direction perpendicular to the inclined surface. That is, the hand moving mechanism 12 can move in a direction within an X-Z plane. The hand 11 has a pair of parallel gripping fingers at an adjustable gap therebetween. The hand 11 is mounted on the arm portion 121 of the hand moving mechanism 12 so as to have a movable range in a direction parallel to the arm portion 121, that is, in the Y axis direction.

The hand 11 can grip the glass substrate 5 by making the gap between the grip fingers narrow at a position capable of gripping the glass substrate 5 and holding the end surface of the glass substrate 5. Here, as described above, since the glass substrates 5 are stably stored in the substrate storage case 51 at constant intervals, the hand 11 can easily grip the glass substrate 5. The substrate transfer mechanism 10, which has gripped the glass substrate 5 by the hand 11, suitably moves the hand moving mechanism 12 and the hand 11 in the movable range so as to move the glass substrate 5 to the periphery of a pocket 21 disposed at a first position described below. In this state, by opening the gap of the grip fingers of the hand 11 wide so as to release the glass substrate 5, the substrate transfer mechanism 10 can place the glass substrate 5 in the pocket 21. At this time, the glass substrate 5 is placed with its surface, on which the transparent electrodes and the alignment film are not formed, turned toward the pocket 21. Therefore, when the glass substrate 5 is placed, its surface, on which the alignment film is formed, is rarely contaminated.

As described above, the substrate transfer mechanism 10 can draw out the glass substrate 5 stored in the substrate storage case 51 and can place the glass substrate 5 in the pocket 21.

A2. Substrate Placing Mechanism

As shown in FIG. 1, the rotary pocket 20 serving as 'substrate placing mechanism' has the pocket 21 serving as 'substrate placement section', a pocket base section 22, and a moving mechanism 23. The pocket 21 is fixed to the pocket base section 22, and the pocket base section 22 is attached to the moving mechanism 23.

Figure 3:
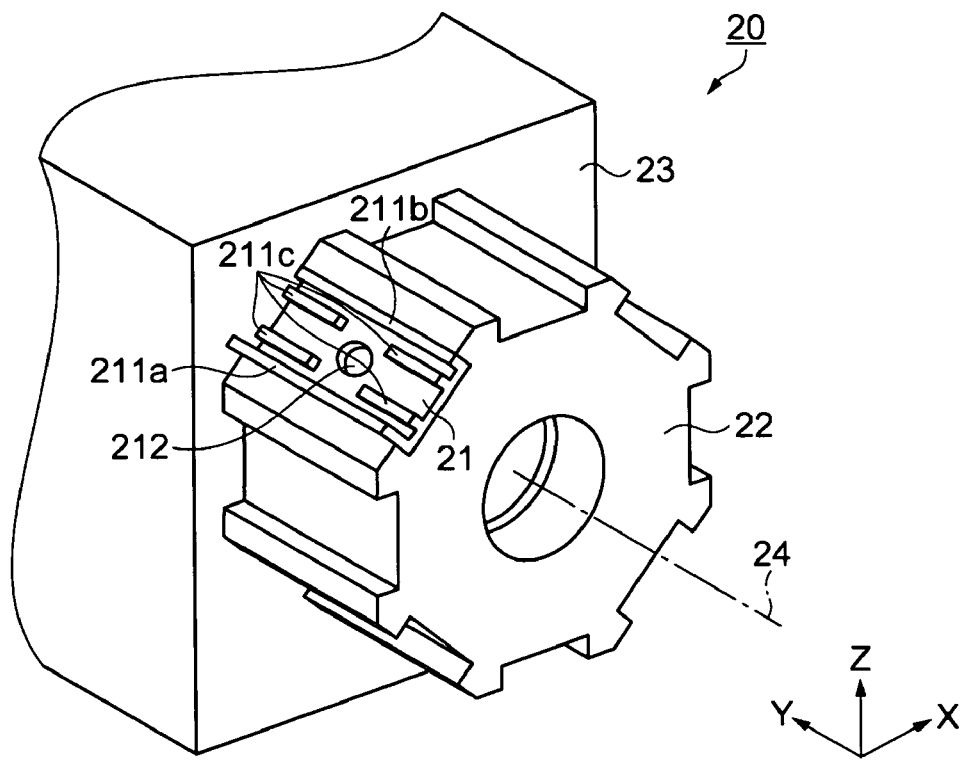
FIG. 3 is a schematic view of a rotary pocket which serves as a substrate placing mechanism and has a pocket serving as a substrate placement section disposed at a first position.
Figure 4:
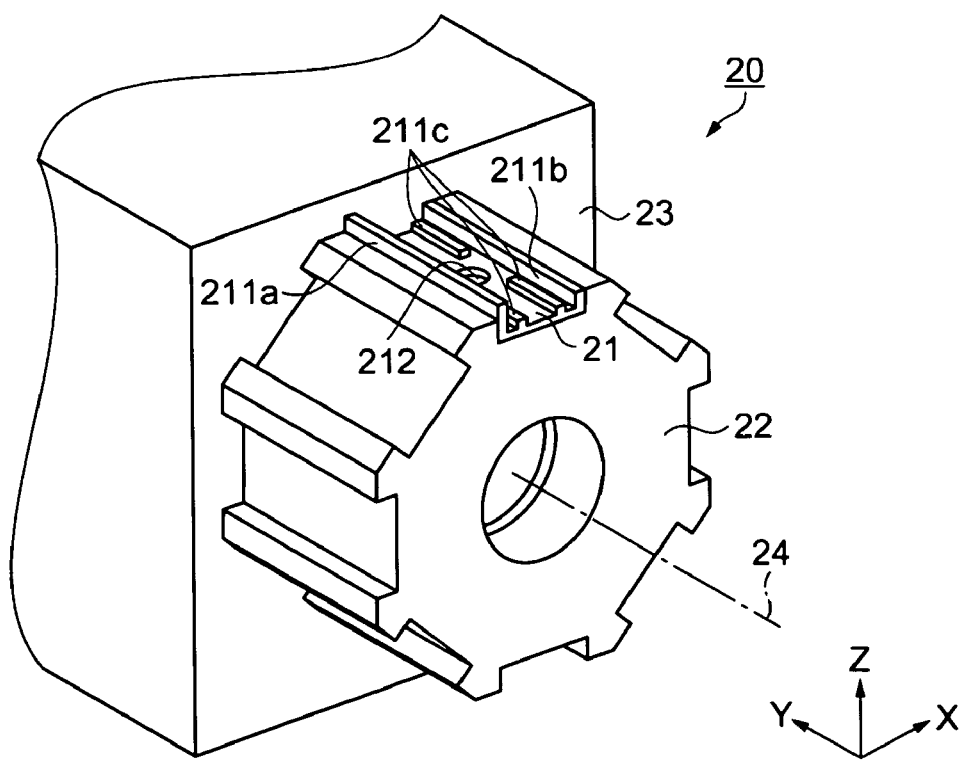
FIG. 4 is a schematic view of a rotary pocket which serves as a substrate placing mechanism and has a pocket serving as a substrate placement section disposed at a second position.

Here, the arrangement and operation of the parts of the rotary pocket 20 will be described in detail with reference to FIGS. 3 and 4. As shown in FIG. 3, the pocket base section 22 has substantially a regular octagonal prism in which eight surfaces are arranged in a ring shape so as to provide the pocket 21, and is attached to the moving mechanism 23 such that a pair of surfaces from the eight surfaces is substantially parallel to the moving mechanism 23. The pocket base section 22 is formed of a metal. On one surface inclined by +45 degrees with respect to the horizontal plane of the eight surfaces, the pocket 21 is provided. Hereinafter, the position of the pocket 21 is referred to as 'first position'. In the pocket 21 disposed at the first position, the glass substrate 5 can be placed by the substrate transfer mechanism 10.

The pocket 21 is a metal part capable of placing the glass substrate 5 therein, and has partition walls 211a, 211b, and 211c for defining the position of the end surface of the glass substrate 5 and an absorbing hole 212. Moreover, the surface of the pocket 21 may be coated with fluorocarbon resin so as to prevent the glass substrate 5 from being damaged. The absorbing hole 212 has a negative pressure with respect to outside air so as to absorb outside air or an object in the periphery of the absorbing hole. The partition wall 211a becomes relatively higher than the partition walls 211b and 211c. According to this configuration, the glass substrate 5 released from the above-described hand 11 to the pocket 21 disposed at the first position is temporarily supported by the partition wall 211a, leans against the pocket 21 by its weight and the negative pressure generated in the absorbing hole 212, and is placed in the pocket 21. The glass substrate 5 placed in the pocket 21 is fixed to the pocket 21 by suction force of the absorbing hole 212 and the partition walls 211a, 211b, 211c.

Moreover, the glass substrate 5 placed in the pocket 21 disposed at the first position is substantially parallel to the glass substrate 5 stored in the above-described substrate storage case 51 and the glass substrate 5 gripped by the hand 11. That is, the glass substrate 5 gripped by the hand 11 and moved to the periphery of the pocket 21 is placed in the pocket 21 with no substantial change in the angle. According to this configuration, the above-described substrate transfer mechanism 10 can easily place the glass substrate 5 in the pocket 21.

The moving mechanism 23 can rotate the pocket base section 22 around a rotational shaft 24 parallel to the Y axis shown in FIG. 3 with a rotating mechanism (not shown) provided therein. FIG. 4 shows a state in which the moving mechanism 23 rotates the pocket base section 22 such that the pocket 21 is in a vertical upward direction. Hereinafter, the position of the pocket 21 is referred to as 'second position'. A substrate holding mechanism 30 described below can hold the glass substrate 5 placed in the pocket 21 disposed at the second position. The moving mechanism 23 can rotate the pocket base section 22 in any direction by an arbitrary rotation amount, and thus the pocket 21 can be returned from a second state to a first state.

Moreover, in this embodiment, the pocket 21 is provided on one of the eight surfaces of the pocket base section 22, but other pockets 21 may be simultaneously provided on other surfaces. For example, if pockets, which can store glass substrates having different sizes, are individually provided on the surfaces, by suitably rotating the pocket base section 22, the glass substrates having different sizes can be transferred.

Further, as shown in FIG. 1, the entire rotary pocket 20 is configured to move in the X axis direction. More specifically, the rotary pocket 20 can move between a position at which the hand 11 can place the glass substrate 5 in the pocket 21 disposed at the first position (a position indicated by a two-dot-chain line in FIG. 1), and a position at which an absorption collect 31 described below can hold the glass substrate 5 from the pocket 21 disposed at the second position (a position indicated by a solid line in FIG. 1). Hereinafter, the former is referred to as 'third position', and the latter is referred to as 'fourth position'. The movement of the rotary pocket 20 is realized by a driving device (not shown) in the moving mechanism 23.

This can be specifically described in view of the transport of the glass substrate 5. That is, when the pocket 21 is disposed at the first position, and the entire rotary pocket 20 is disposed at the third position, the hand 11 can place the glass substrate 5 in the pocket 21. Further, when the pocket 21 is disposed at the second position, and the entire rotary pocket 20 is disposed at the fourth position, the absorption collect 31 can hold the glass substrate 5 from the pocket 21.

As described above, the rotary pocket 20 serving as the substrate placing mechanism can place the glass substrate 5 in the pocket 21 and can move the placed glass substrate 5 between the predetermined positions.

A3. Substrate Holding Mechanism and Transport Mechanism

As shown in FIG. 1, the substrate holding mechanism 30 has the absorption collect 31 serving as 'absorbing mechanism' at a lower end in the Z axis direction. An upper end of the substrate holding mechanism 30 is attached to the transport mechanism 40. Further, to the substrate holding mechanism 30, a camera 94 is fixed in a vertical downward direction.

The absorption collect 31 has a rectangular ring-shaped absorbing section which can absorb an object by a negative pressure. The rectangular ring-shaped absorbing section is constantly parallel to an X-Y plane, and its shape corresponds to an outer circumference of the glass substrate 5. Accordingly, the absorption collect 31 faces and absorbs the glass substrate 5, such that the absorption collect 31 can be brought into contact with only the outer circumference of the glass substrate 5 and can hold the glass substrate 5. The alignment film is not disposed at the outer circumference of the glass substrate 5, and thus the absorption collect 31 can hold the glass substrate 5, without contaminating the alignment film. Moreover, the substrate holding mechanism 30 can rotate the absorption collect 31 around the Z axis. Hereinafter, the rotation angle is represented by θ.

The transport mechanism 40 can transport the substrate holding mechanism 30 including the absorption collect 31. More specifically, the substrate holding mechanism 30 can be vertically moved in the Z axis direction, and can parallel move in the X-Y plane.

With the above-described operation of the substrate holding mechanism 30 including the absorption collect 31 and the transport mechanism 40, the substrate holding mechanism 30 can hold the glass substrate 5 placed in the pocket 21 disposed at the second position and can discharge the glass substrate 5 so as to be stored on the substrate storage surface 62 of the palette 61.

Figure 5:
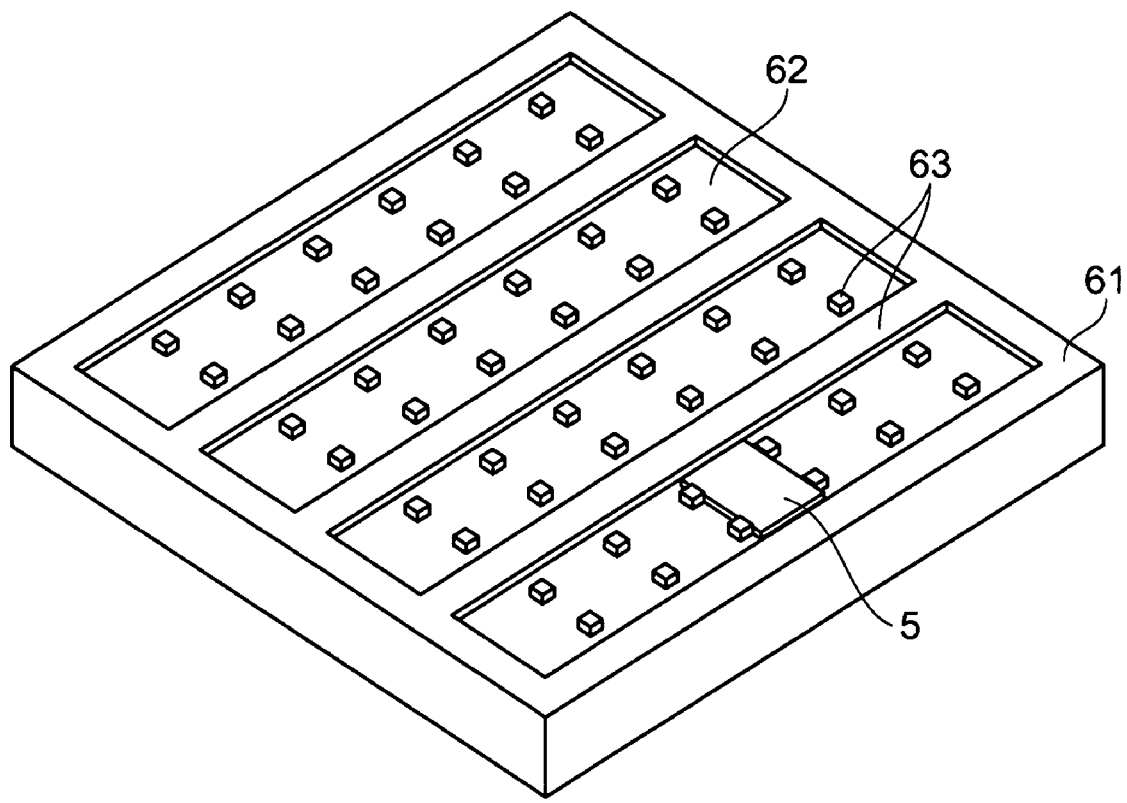
FIG. 5 is a schematic perspective view of a palette which serves as a second substrate storage case.

Here, the palette 61 is a metal substrate storage case, which is placed on the palette placement section 60 in a horizontal state. FIG. 5 is a schematic perspective view of the palette 61. The palette 61 has pallet partition walls 63, which are formed by cutting and bending a metal plate. The palette partition walls 63 are formed to fit to the size of the glass substrate 5. On the substrate storage surfaces 62 divided by the palette partition walls 63, 20 glass substrates 5 in total are stored.

Moreover, since the palette 61 and the pocket 21 disposed at the second position can place the glass substrate 5 in the horizontal states, after temporarily holding the glass substrate 5, the substrate holding mechanism 30 can store the glass substrate 5 on the substrate storage surface 62, without adjusting the elevation angle of the glass substrate 5.

Hereinafter, a position of the substrate holding mechanism 30 when the substrate holding mechanism 30 holds the glass substrate 5 placed in the pocket 21 is referred to as 'hold position', and a position of the substrate holding mechanism 30 when the substrate holding mechanism 30 discharges the glass substrate 5 to the substrate storage surface 62 is referred to as 'discharge position'. According to this configuration, the transport mechanism 40 transports the substrate holding mechanism 30 between the hold position and the discharge position.

The discharge position is a position at which, when the substrate holding mechanism 30 discharges the glass substrate 5, the glass substrate 5 is stored on the substrate storage surface 62. Therefore, the end surfaces of the glass substrate 5 held by the substrate holding mechanism 30 at the discharge position need to be aligned with the end surfaces of the palette partition walls 63 corresponding to the substrate storage surface 62 with high precision, on which the glass substrate 5 is to be stored. With the functions of the cameras 93 and 94 described below, the transport mechanism 40 can move the substrate holding mechanism 30 to the discharge position satisfying such a condition. The substrate holding mechanism 30, which has moved to the discharge position, discharges the glass substrate 5, thereby storing the glass substrate 5 on the substrate storage surface 62.

The absorption collect 31 of the substrate holding mechanism 30 absorbs one plane of the glass substrate 5 and holds the glass substrate 5, and thus all the end surfaces of the glass substrate 5 are not brought into contact with any foreign substance. For this reason, even if the palette 61 has the palette partition walls 63, the substrate holding mechanism 30 can easily discharge the glass substrate 5 to the substrate storage surface 62, without being brought into contact with the palette partition walls 63.

A4. Detecting Mechanism

As shown in FIG. 1, in the substrate transfer apparatus 1, at one point of the movable range of the substrate holding mechanism 30, the camera 93 is disposed in a direction opposite to the substrate holding mechanism 30, that is, in a vertical upward direction. In addition, as described above, to the substrate holding mechanism 30, the camera 94 is fixed in a vertical downward direction. The camera 93 is connected to a processing unit 71 through a substrate end surface judging unit 97 (see FIG. 6). Further, similarly, the camera 94 is connected to the processing unit 71 through a palette partition wall end surface judging unit 98 (see FIG. 6).

The cameras 93 and 94 are cameras having image-capturing elements, which use CCDs (Charge Coupled Devices). The camera 93 captures images of the end surfaces of the glass substrate 5 held by the substrate holding mechanism 30, and transmits data of the captured images to the substrate end surface judging unit 97. The substrate end surface judging unit 97 detects the positions and angles of the end surfaces of the glass substrate 5 from the received data, and transmits the detection information to the processing unit 71. On the other hand, the camera 94 captures images of the ends surfaces of the palette partition walls 63 of the substrate storage surface 62, on which the glass substrate 5 held by the substrate holding mechanism 30 is to be stored, and transmits data of the captured images to the palette partition wall end surface judging unit 98. The palette partition wall end surface judging unit 98 detects the positions and angles of the end surfaces of the palette partition walls 63 from the received data, and transmits the detection information to the processing unit 71.

Here, the camera 93 and the substrate end surface judging unit 97 correspond to 'third detecting mechanism' of the invention, and the camera 94 and the palette partition wall end surface judging unit 98 correspond to 'fourth detecting mechanism' of the invention.

The processing unit 71 receives the information of the positions and angles of the end surfaces of the glass substrate 5 and the end surfaces of the palette partition walls 63 from the substrate end surface judging unit 97 and the palette partition wall end surface judging unit 98, and calculates a suitable discharge position of the substrate holding mechanism 30 from the data. And then, the processing unit 71 transmits information, which is required for moving the substrate holding mechanism 30 and the absorption collect 31 to the discharge position, to the transport mechanism 40 and the substrate holding mechanism 30. The required information is movement amounts of the substrate holding mechanism 30 in the X, Y, and Z directions, and the rotation angle θ of the absorption collect 31. The former is transmitted to the transport mechanism 40, and the latter is transmitted to the substrate holding mechanism 30. The transport mechanism 40 moves the substrate holding mechanism 30 on the basis of the received information. Further, the substrate holding mechanism 30 rotates the absorption collect 31 on the basis of the received information. By doing so, the substrate holding mechanism 30 including the absorption collect 31 is moved to the discharge position at which the glass substrate 5 can be suitably discharged to the substrate storage surface 62.

In the substrate transfer apparatus 1, the cameras 91 and 92 are further disposed. The cameras 91 and 92 are disposed at a point of the movable range of the rotary pocket 20 so as to face the pocket 21 at the second position, that is, in a vertical downward direction. The camera 91 is connected to the processing unit 71 through a direction judging unit 95 (see FIG. 6). Further, the camera 92 is connected to the processing unit 71 through a damage judging unit 96 (see FIG. 6).

Like the cameras 93 and 94, the camera 91 is also a camera having an image-capturing element, which uses a CCD. The camera 91 captures an image of a direction judging mark of the glass substrate 5 placed in the pocket 21, and transmits data of the captured image to the direction judging unit 95. The direction judging unit 95 detects and judges the direction of the glass substrate 5 from the received data. Specifically, if the direction judging mark exists at a predetermined position, it is judged that the direction of the glass substrate 5 is normal. Further, if the direction judging mark exists on a side opposite to the predetermined position, that is, at a point-symmetrical position with respect to the center of the glass substrate 5, it is judged that the direction of the glass substrate 5 is misaligned by 180 degrees. In addition, if the position of the direction judging mark does not come under the above-described cases, it is judged that abnormal placing including the turnover of the glass substrate 5, other than the above-described cases, is performed. Next, the direction judging unit 95 transmits information regarding the direction of the glass substrate 5 to the processing unit 71. The processing unit 71 does not perform a special operation when the direction is normal. Further, if the direction is misaligned by 180 degrees, when the substrate holding mechanism 30 holds the glass substrate 5, the processing unit 71 transmits a signal for rotating the substrate holding mechanism 30 in the θ direction by 180 degrees to the transport mechanism 40. In addition, if the direction is turned over, the entire substrate transfer apparatus 1 stops. Moreover, the camera 91 and the direction judging unit 95 correspond to 'first detecting mechanism' of the invention.

Like the cameras 93 and 94, the camera 92 is also a camera having an image-capturing element, which uses a CCD. The camera 92 captures images of the end surfaces of the glass substrate 5 placed in the pocket 21, and transmits data of the captured images to a damage judging unit 96. The damage judging unit 96 detects and judges presence/absence of cracks or fragments in the glass substrate 5 from the received data. Specifically, when contrast is changed due to the damages, such as cracks or fragments in the captured images of the end surfaces, it is judged that the glass substrate 5 is damaged. And then, the damage judging unit 96 transmits information regarding presence/absence of the damage in the glass substrate 5 to the processing unit 71. When the glass substrate 5 is not damaged, the processing unit 71 does not perform a special operation. Further, when the damage exists, the entire substrate transfer apparatus 1 stops. Moreover, the camera 92 and the damage judging unit 96 correspond to 'second detecting mechanism' of the invention.

With the functions of the cameras 91 and 92, only the undamaged glass substrate 5 can be transferred to the substrate storage surface 62 of the palette 61 in a predetermined direction.

The substrate transfer apparatus 1 having the above-described configuration can transfer the glass substrate 5 from the substrate storage case 51 onto the substrate storage surface 62 of the palette 61 without human hands.

B. Method of Transferring Substrate

The electrical configuration of the substrate transfer apparatus 1 will now be described with reference to FIG. 6. And then, on the basis of this description, a method of transferring a substrate according to this embodiment will be described with reference to FIGS. 7 to 9C.

Figure 6:
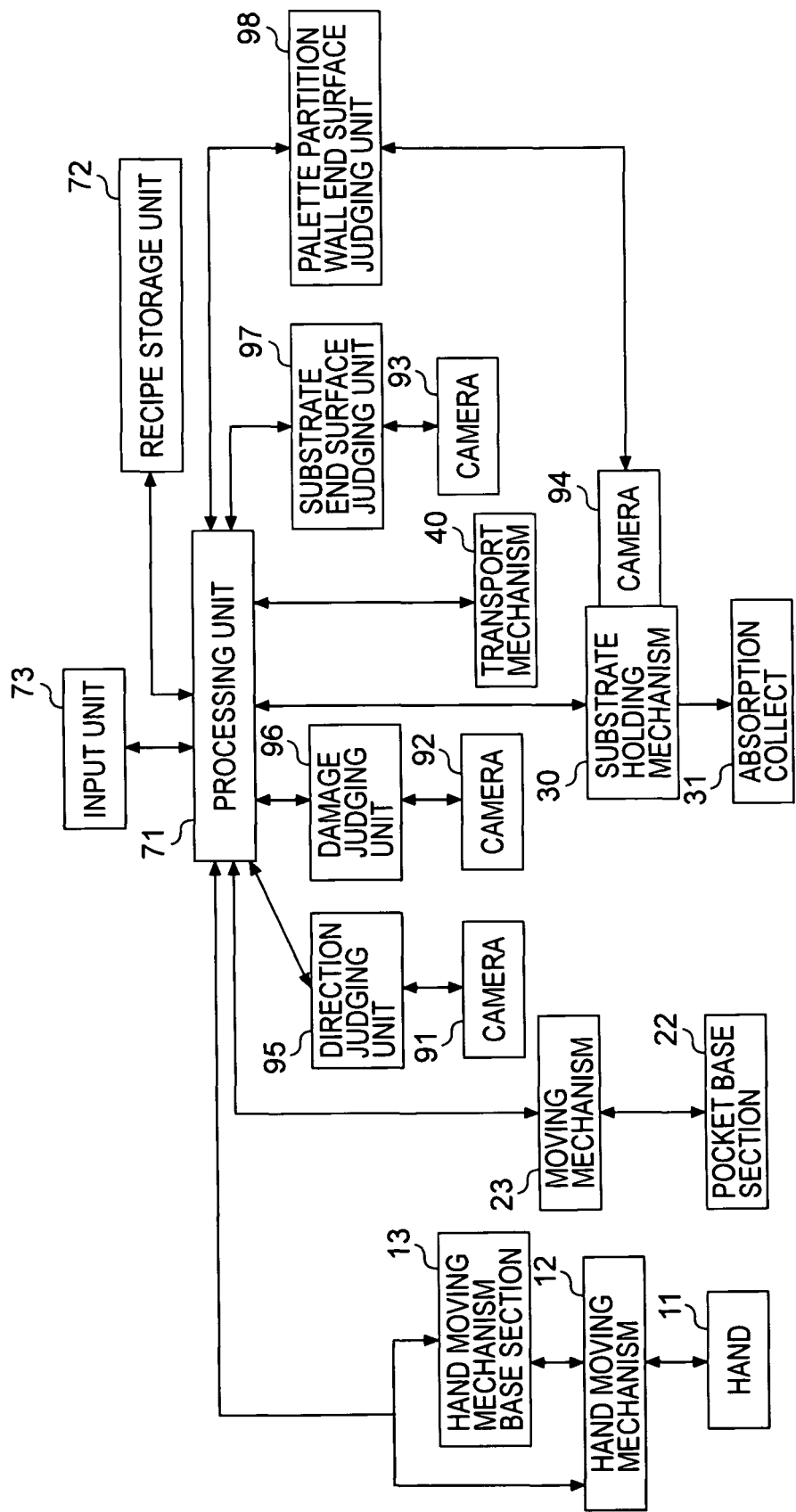
FIG. 6 is a block diagram showing an electrical configuration of a substrate transfer apparatus.

FIG. 6 is a block diagram showing the electrical configuration of the substrate transfer apparatus 1. As shown in FIG. 6, the processing unit 71 is connected to the hand moving mechanism 12, the hand moving mechanism base section 13, the moving mechanism 23, the direction judging unit 95, the damage judging unit 96, the substrate end surface judging unit 97, the palette partition wall end surface judging unit 98, the substrate holding mechanism 30, the transport mechanism 40, a recipe storage unit 72, and an input unit 73. The processing unit 71 receives and processes various kinds of information and signals from the above-described parts, and transmits various information and signals to the above-described parts. The substrate transfer apparatus 1 is an apparatus which transfers the substrates by causing the processing unit 71 to transmit the signals for driving the substrate transfer mechanism 10, the rotary pocket 20, the substrate holding mechanism 30, the transport mechanism 40, and the like at predetermined timing, thereby sequentially driving these parts so as to transfer the substrates.

The recipe storage unit 72 receives and stores recipe information input from the input unit 73 through the processing unit 71. Here, the recipe information includes the size of the glass substrate 5, the number of glass substrates 5 stored in the substrate storage case 51, the pitch of the support groove 52, the position of the direction judging mark, and the arrangement of the substrate storage surfaces 62 of the palette 61 (the number of rows and columns).

Figure 7:
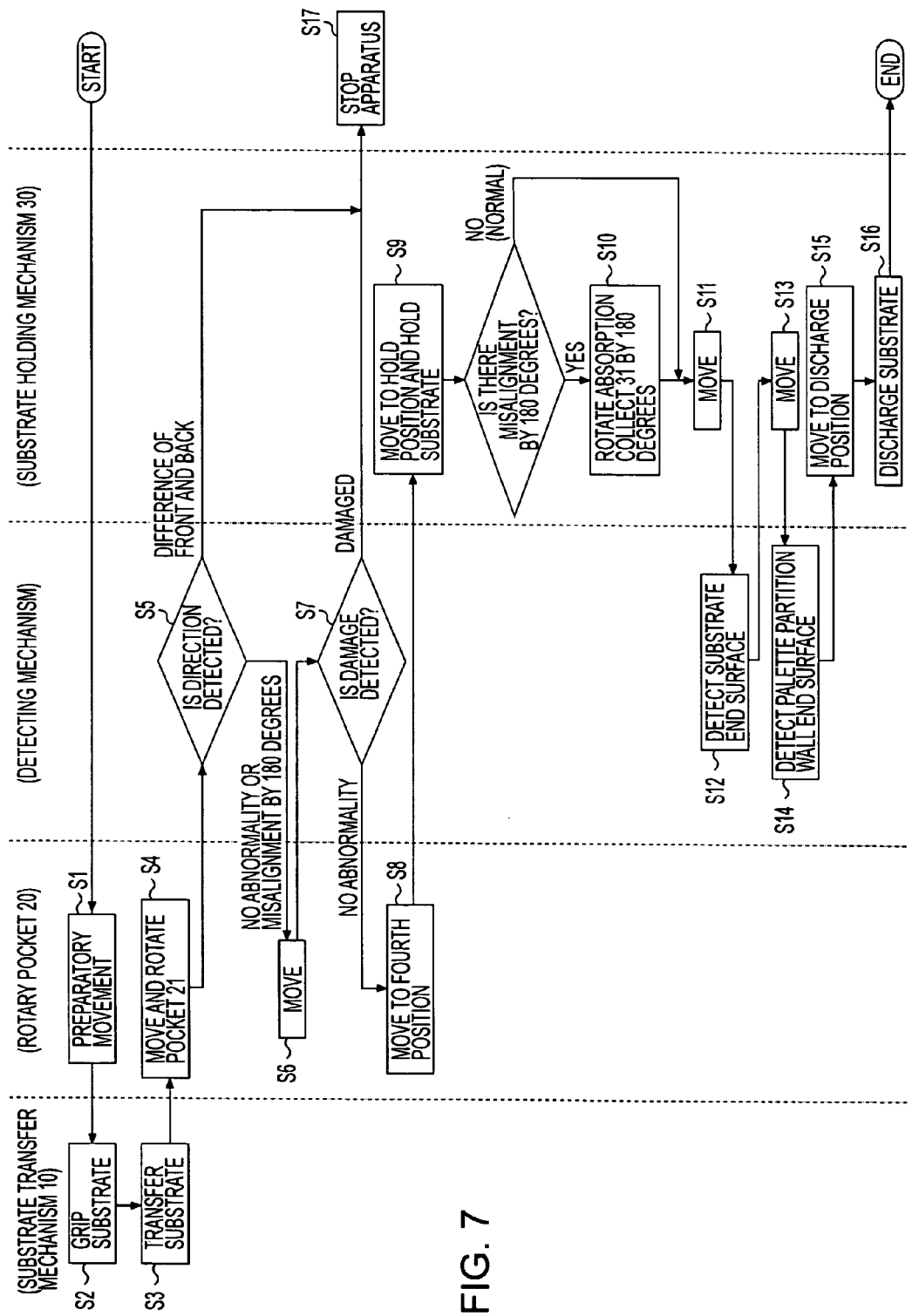
FIG. 7 is a process view showing a method of transferring a substrate according to an embodiment of the invention.

Next, the method of transferring a substrate according to this embodiment will be described with reference to FIG. 7 to 9C. As shown in a process view of FIG. 7, the method of transferring a substrate according to this embodiment includes a process S1 to a process S17. In FIG. 7, the respective processes are arranged and divided in a row direction for each target part, and arrows indicate the progress direction of the processes. FIGS. 8A to 9C are schematic views of the method of transferring a substrate according to this embodiment.

In the process S1, the rotary pocket 20 moves to the third position, and the pocket 21 moves to the first position. These movements are executed by causing the moving mechanism 23 to receive the driving signals sent from the processing unit 71, and causing the moving mechanism 23 to parallel move the entire rotary pocket 20 on the basis of the signals and to rotate the pocket base section 22 around the rotational shaft 24.

Next, in the process S2, the hand 11 of the substrate transfer mechanism 10 grips the glass substrate 5 stored in the substrate storage case 51. More specifically, this process includes a step of parallel moving the hand 11 to a position capable of gripping the glass substrate 5, and a step of causing the grip fingers of the hand 11 to hold the end surface of the glass substrate 5 and to grip the glass substrate 5.

The movement of the hand 11 and gripping of the glass substrate 5 by the grip fingers are performed by the combination of the following operations. The processing unit 71 sends signals for the movement and gripping to the hand moving mechanism base section 13 and the hand moving mechanism 12. The hand moving mechanism base section 13 moves the hand moving mechanism 12 on the basis of the signals. The hand moving mechanism 12 moves the hand 11 and the grip fingers of the hand 11 on the basis of the signals. The hand 11 is moved by the combination of these operations, and grips the glass substrate 5. Moreover, the signals sent by the processing unit 71 is generated by the processing unit 71 on the basis of the size of the glass substrate 5 stored in the recipe storage unit 72, the number of glass substrates 5 stored in the substrate storage case 51, and information regarding the pitch of the support groove 52 of the substrate storage case 51.

Figure 8A:
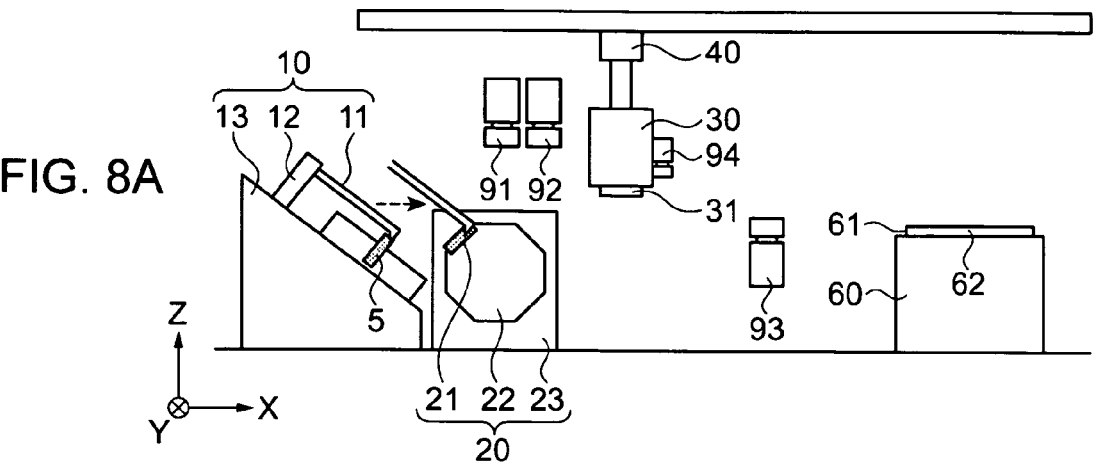
FIG. 8A is a schematic view showing a method of transferring a substrate according to an embodiment of the invention.

When the glass substrate 5 has been gripped by the hand 11, the process S3 is performed. In this process, as shown in FIG. 8A, the hand 11 of the substrate transfer mechanism 10 places the glass substrate 5 in the pocket 21 of the rotary pocket 20. More specifically, this process includes a step of moving the hand 11 to a position at which the glass substrate 5 can be placed in the pocket 21, and a step of causing the grip fingers of the hand 11 to release the glass substrate 5 such that the glass substrate 5 is placed in the pocket 21.

The movement of the hand 11 and opening of the glass substrate 5 are performed by the combination of the following operations. The processing unit 71 sends signals for the movement and opening to the hand moving mechanism base section 13 and the hand moving mechanism 12. The hand moving mechanism base section 13 moves the hand moving mechanism 12 on the basis of the signals. The hand moving mechanism 12 moves the hand 11 and the grip fingers of the hand 11 on the basis of the signals. The hand 11 is moved by the combination of these operations and opens the glass substrate 5.

The processes S2 and S3 correspond to 'causing the substrate transfer mechanism to hold and transfer the glass substrate' of the invention.

Figure 8B:
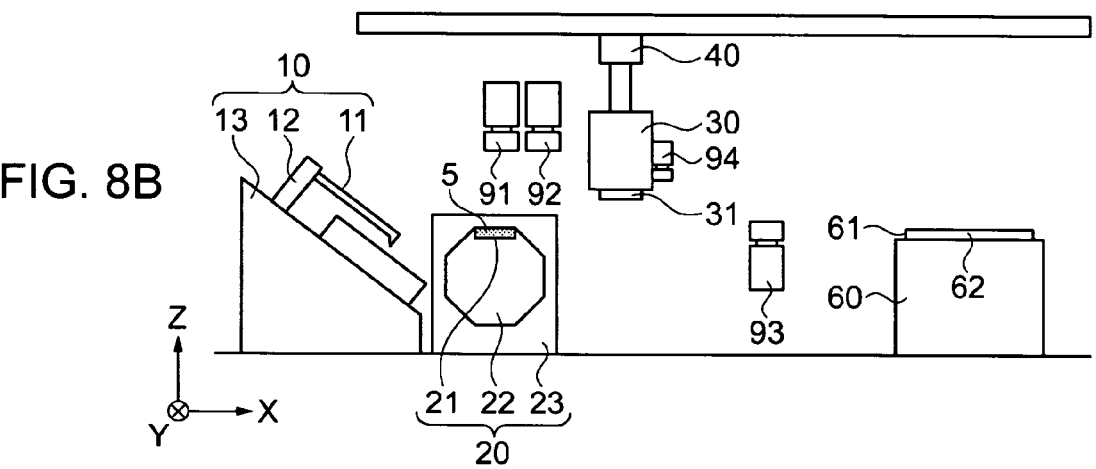
FIG. 8B is a schematic view showing a method of transferring a substrate according to an embodiment of the invention.

Next, in the process S4, the pocket 21 of the rotary pocket 20 moves to the second position, and the rotary pocket 20 moves to a position at which the pocket 21 and the camera 91 face each other (see FIG. 8B). The movements of the rotary pocket 20 and the pocket 21 are executed by causing the moving mechanism 23 to receive signals for the movements sent from the processing unit 71, and causing the moving mechanism 23 to parallel move the entire rotary pocket 20 on the basis of the signals and to rotate the pocket base section 22 around the rotational shaft 24.

When the movement of the rotary pocket 20 is completed, in the process S5, the direction of the glass substrate 5 placed in the pocket 21 is detected. This detection is performed by the cooperation of the camera 91, the direction judging unit 95, and the processing unit 71. The judgment operation is as described above, and thus the description thereof will be omitted in order to avoid repeating.

Figure 8C:
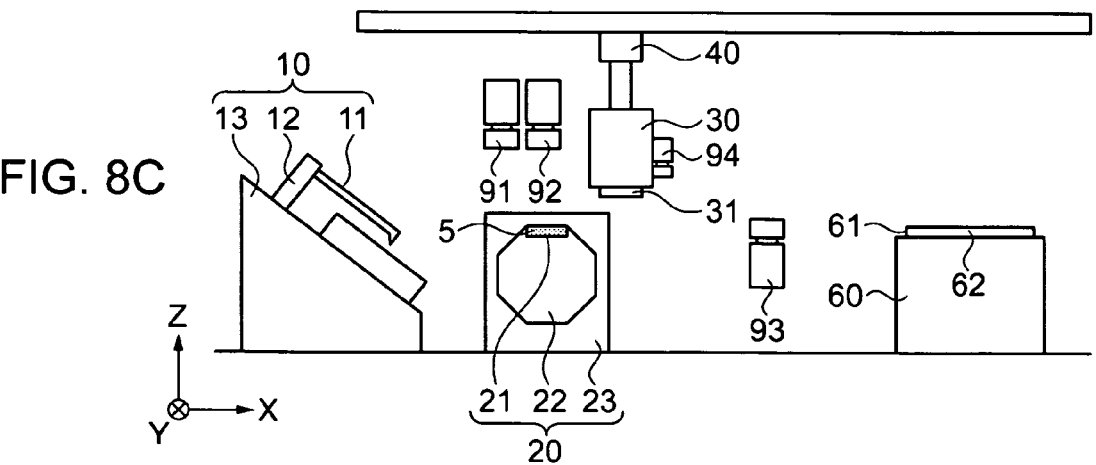
FIG. 8C is a schematic view showing a method of transferring a substrate according to an embodiment of the invention.

When it is judged in the process S5 that the glass substrate 5 is correctly placed or the glass substrate 5 is placed in a state of being rotated by 180 degrees, in the process S6, the rotary pocket 20 moves to a position at which the pocket 21 and the camera 92 face each other (see FIG. 8C). The movement of the rotary pocket 20 is executed by causing the moving mechanism 23 to receive a signal for the movement sent from the processing unit 71, and causing the moving mechanism 23 to parallel move the entire rotary pocket 20 on the basis of the signal.

When the movement of the rotary pocket 20 is completed, in the process S7, the damage of the glass substrate 5 placed in the pocket 21 is detected. This detection is performed by the cooperation of the camera 92, the damage judging unit 96, and the processing unit 71. The judgment operation is as described above, and thus the description thereof will be omitted in order to avoid repeating.

Moreover, when it is judged in the process S5 that the glass substrate 5 is placed in a state of being turned over, or when it is judged in the process S6 that the glass substrate 5 is damaged, the process S17 is performed. In this process, the processing unit 71 stops the substrate transfer apparatus. And then, a worker performs processing such as the removal of the glass substrate 5 or the like, and then the transfer of the glass substrate 5 restarts from the process S1.

When it is judged in the process S7 that the glass substrate 5 is not damaged, in the process S8, the rotary pocket 20 moves to the fourth position. The movement of the rotary pocket 20 is executed by causing the moving mechanism 23 to receive a signal for the movement sent from the processing unit 71, and causing the moving mechanism 23 to parallel move the entire rotary pocket 20 on the basis of the signal.

When the movement of the rotary pocket 20 is completed, the process S9 is performed. In this process, as shown in FIG. 9A, the substrate holding mechanism 30 moves to the hold position, and the absorption collect 31 of the substrate holding mechanism 30 holds the glass substrate 5 placed in the pocket 21. This process corresponds to 'causing the substrate holding mechanism to hold the glass substrate' of the invention.

The movement of the substrate holding mechanism 30 to the hold position is executed by causing the transport mechanism 40 to receive a signal for the movement sent from the processing unit 71, and causing the transport mechanism 40 to move accompanied by the substrate holding mechanism 30 on the basis of the signal. Further, the absorption of the glass substrate 5 by the absorption collect 31 is executed by causing the substrate holding mechanism 30 to a signal for the absorption sent from the processing unit 71, and causing the substrate holding mechanism 30 to perform the absorption operation of the absorption collect 31 on the basis of the signal. Moreover, when the absorption collect 31 absorbs the glass substrate 5, the absorption of the glass substrate 5 by the absorbing hole 212 of the pocket 21 is not performed.

Here, when it is judged in the process S5 that the glass substrate 5 is rotated by 180 degrees from a normal direction, the process S10 is performed. In the process S10, the substrate holding mechanism 30 rotates the absorption collect 31 by 180 degrees in the θ direction. This rotation is executed by causing the substrate holding mechanism 30 to receive a signal for the rotation sent from the processing unit 71, and causing the substrate holding mechanism 30 to rotate the absorption collect 31 on the basis of the signal. Through this process, the direction of the glass substrate 5 is corrected to the normal state.

When the process S10 ends, or when, in the process S9, the substrate holding mechanism 30 holds the glass substrate 5 in the normal direction, the process S11 is performed. In the process S11, the substrate holding mechanism 30 moves to a position at which the glass substrate 5 and the camera 93 face each other (see FIG. 9B). The movement of the substrate holding mechanism 30 is executed by causing the transport mechanism 40 to receive a signal for the movement sent from the processing unit 71, and causing the transport mechanism 40 to move accompanied by the substrate holding mechanism 30 on the basis of the signal.

Subsequently, in the process S12, the end surface of the glass substrate 5 is detected. This process is performed by the cooperation of the camera 93, the substrate end surface judging unit 97, and the processing unit 71. The detection operation is as described above, and thus the description thereof will be omitted in order to avoid repeating.

Next, in the process S13, the substrate holding mechanism 30 moves to a position at which the camera 94 and the substrate storage surface 62 of the palette 61 face each other. As described above, the camera 94 is fixed to the substrate holding mechanism 30, and thus the camera 94 moves along the movement of the substrate holding mechanism 30.

In a state in which the camera 94 and the substrate storage surface 62 face each other in such a manner, in the process S14, the end surfaces of the palette partition walls 63 are detected. This process is performed by the cooperation of the camera 94, the palette partition wall end surface judging unit 98, and the processing unit 71. The detection operation is as described above, and thus the description thereof will be omitted in order to avoid repeating.

When the detection of the end surfaces of the palette partition walls 63 ends, the process S15 is performed. In this process, the substrate holding mechanism 30 moves to the discharge position (see FIG. 9C). This process corresponds to 'causing the transport mechanism to move the substrate holding mechanism to the discharge position' of the invention.

In this process, the movement of the substrate holding mechanism 30 is performed as follows. In the processes S12 and S14, the processing unit 71 receives the information of the positions and angles of the end surface of the glass substrate 5 and the end surfaces of the palette partition walls 63 from the substrate end surface judging unit 97 and the palette partition wall end surface judging unit 98. The processing unit 71 calculates, from the data, information required for moving the glass substrate 5 held by the substrate holding mechanism 30 to a suitable position, and transmits the information to the transport mechanism 40 and the substrate holding mechanism 30. The required information is the movement amounts of the substrate holding mechanism 30 in the X, Y, and Z directions, and the rotation angle θ of the absorption collect 31. The former is transmitted to the transport mechanism 40, and the latter is transmitted to the substrate holding mechanism 30. Next, the transport mechanism 40 moves the substrate holding mechanism 30 on the basis of the received information. Further, the substrate holding mechanism 30 rotates the absorption collect 31 on the basis of the received information. By doing so, the substrate holding mechanism 30 including the absorption collect 31 moves to the suitable discharge position.

Subsequently, in the process S16, the absorption collect 31 of the substrate holding mechanism 30 discharges the glass substrate 5, and the glass substrate 5 is stored in the substrate storage surface 62 of the palette 61. This process corresponds to 'causing the substrate holding mechanism to discharge and dispose the glass substrate' of the invention.

This process is performed by causing the processing unit 71 to send a signal for discharging the glass substrate 5 to the substrate holding mechanism 30. The substrate holding mechanism 30, which receives the signal, stops the absorption operation of the absorption collect 31 so as to discharge the glass substrate 5. The discharged glass substrate 5 is stored on the substrate storage surface 62 of the palette 61 in a state shown in FIG. 5.

Through the above-described processes, one glass substrate 5 is transferred from the substrate storage case 51 to the substrate storage surface 62 of the palette 61. The time duration for a series of processes is about seven seconds. These processes are repeated by the number of glass substrates 5 stored in the substrate storage case 51, which is stored in the recipe storage unit 72. Similarly, the glass substrates 5 are stored in the palette 61 on the basis of the arrangement information (the number of rows and columns) of the substrate storage surfaces 62 of the palette 61.

By doing so, all the glass substrates 5 stored in the substrate storage case 51 can be transferred to the palette 61 with high yield, without human hands. The inventors have examined that, when the glass substrates 5 are transferred by human hands, yield is about 75% due to damages, an error in storage direction, and the like. In contrast, the inventors have confirmed that, by using the substrate transfer apparatus 1 of this embodiment, these defects are reduced, and yield is improved to about 96%.

C. Method of Manufacturing Electro-Optical Device

Figure 10:
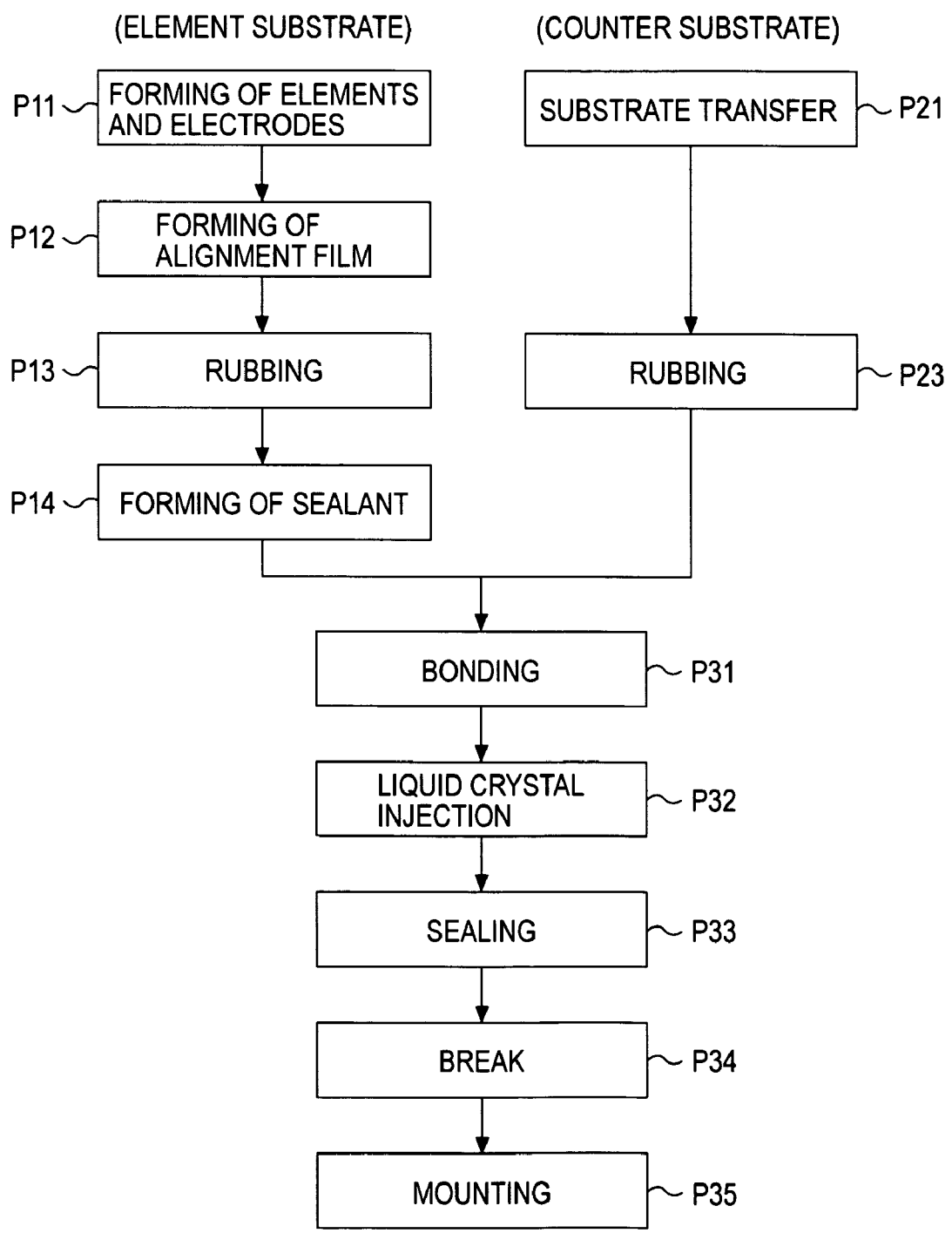
FIG. 10 is a process view showing a method of manufacturing a liquid crystal display device according to an embodiment of the invention.

A method of manufacturing a liquid crystal display device as 'a method of manufacturing an electro-optical device' including the method of transferring a substrate will now be described with reference to FIG. 10. FIG. 10 is process view showing a manufacturing process of a liquid crystal display device of this embodiment. In FIG. 10, processes P11 to P14 are processes for manufacturing a composite element substrate, in which a plurality of element substrates 81 are integrally formed, and processes P21 and P23 are processes for manufacturing a counter substrate 82. Processes P31 to P35 are processes for combining the composite element substrate and the counter substrate 82 so as to finish a liquid crystal panel 80 and a liquid crystal display device 100. The processes P11 to P14 and the processes P21 and P23 are independently performed.

The process P11 is a process for laminating and forming the parts including TFT elements, metal wiring lines, and transparent electrodes on a surface of a disc-shaped quartz glass substrate serving as the composite element substrate. In one quartz glass substrate, the parts corresponding to a plurality of liquid crystal display devices are formed. This process is performed, for example, by a photolithography method.

The process P12 is a process for forming an alignment film formed of polyimide by a flexography method so as to overlap the parts formed in the process P11.

The process P13 is a process for rubbing a surface of the alignment film formed in the process P12 with a cloth, which is called a rubbing treatment. Through the rubbing process, the alignment film has a function of aligning liquid crystal to be brought into contact therewith along a rubbing direction.

The process P14 is a process for forming a sealant on the surface subjected to rubbing in the process P13 by a screen printing method. The sealant is formed on the outer circumference of a region to which the counter substrate 82 is bonded, excluding a part of an injection slot described below for injecting liquid crystal. Through the processes P11 to P14, the composite element substrate is finished.

The process P21 is a process for transferring the glass substrates 5 stored in the substrate storage case 51 to the substrate storage surfaces 62 of the palette 61 by using the substrate transfer apparatus 1, and arranging the glass substrates 5 on the substrate storage surfaces 62. This process includes the above-described processes S1 to S17. These processes are as described above, and thus the descriptions thereof will be omitted in order to avoid repeating. Moreover, as described above, on one surface of the glass substrate 5, the transparent electrodes and the alignment film are formed. The glass substrate 5 is transferred to the palette 61 such that the surface of the glass substrate 5, on which the alignment film is formed, is turned upward.

The process P23 is a process for rubbing alignment films of the surfaces of the glass substrates 5 arranged on the palette 61 in the process P21, which is called a rubbing treatment. The glass substrates 5 are arranged in the palette 61 in parallel on the same plane such that alignment film is turned upward, and thus rubbing can be performed at the same time on all the glass substrates 5 on the palette 61. Through the rubbing process, the alignment film has a function of aligning liquid crystal, which is brought into contact therewith, along a rubbing direction. Through the processes P21 and P23, the counter substrate 82 is finished.

The process P31 is a process for bonding the counter substrate 82 to the composite element substrate by the sealant so as to form a bonded substrate. Bonding is performed by bringing the composite element substrate into contact with the counter substrate 82 and pressing them, and drying the sealant in a state in which the composite element substrate and the counter substrate 82 are aligned (positioned).

The process P32 is a process for injecting liquid crystal into a space surrounded by the composite element substrate, the counter substrate 82, and the sealant. This process is performed by dropping liquid crystal in the injection slot under vacuum and introducing liquid crystal into the space by capillarity.

The process P33 is a process for sealing the injection slot in a state in which a gap between the composite element substrate and the counter substrate 82 is adjusted to a suitable state. Sealing is performed by coating ultraviolet curable resin to the injection slot and curing the resin.

The process P34 is a process for breaking the bonded substrate subjected to the liquid crystal injection and sealing to a size corresponding to an individual liquid crystal display device so as to manufacture the liquid crystal panel 80 as a single product (see FIG. 11A). Breaking is performed by forming scribe grooves in the surface of the composite element substrate and cutting the composite element substrate along the scribed grooves. The liquid crystal panel 80 has the element substrate 81 and the counter substrate 82 having sizes corresponding to the single product obtained by cutting the composite element substrate.

The process P35 is a process for mounting an FPC (Flexible Printed Circuit) 84 for electrical connection to the outside (see FIG. 11A), a dustproof glass 83 so as to prevent foreign substances from being attached to the surface of the liquid crystal panel 80 (see FIG. 11A), and a cover 85 for protection of the liquid crystal panel 80 or heat dissipation (see FIG. 11B) on the liquid crystal panel 80 obtained in the process P34. Through these processes, the liquid crystal display device 100 is manufactured.

According to the method of manufacturing a liquid crystal display device described above, the glass substrate 5 can be transferred from the substrate storage case 51 to the palette 61 without human hands, and thus the liquid crystal display device 100 can be manufactured with high yield. Further, the liquid crystal display device 100 can be manufactured by fewer workers.

Although the embodiment of the invention has been described, various modifications can be added to the embodiment within the scope without departing from the spirit of the invention. The following modifications can be exemplified.

First Modification

Although the glass substrate 5 is transferred from the substrate storage case 51 to the palette 61 in the embodiment, if the substrate transfer apparatus 1 of this embodiment is used, the glass substrate 5 can be transferred from the palette 61 to the substrate storage case 51, that is, in a direction opposite to the above-described direction. Hereinafter, a method of transferring the glass substrate 5 from the palette 61 to the substrate storage case 51 will be described with reference to FIGS. 12A to 12C.

Figure 12A:
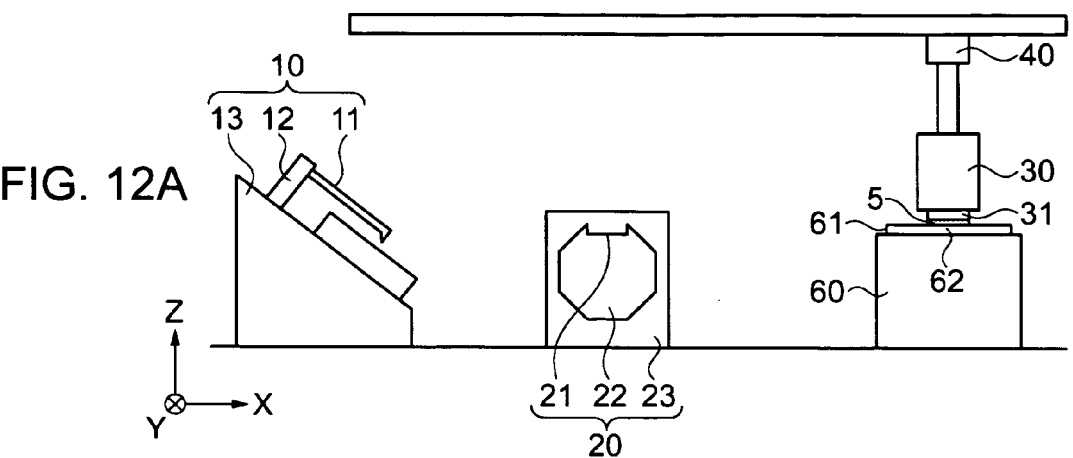
FIG. 12A is a schematic view showing a method of transferring a substrate according to a modification of the invention.
Figure 12B:
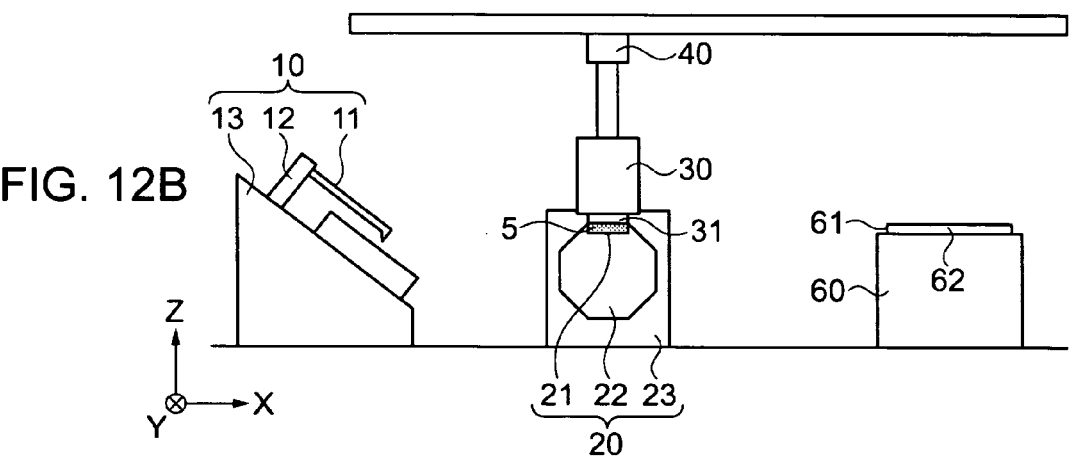
FIG. 12B is a schematic view showing a method of transferring a substrate according to a modification of the invention.
Figure 12C:
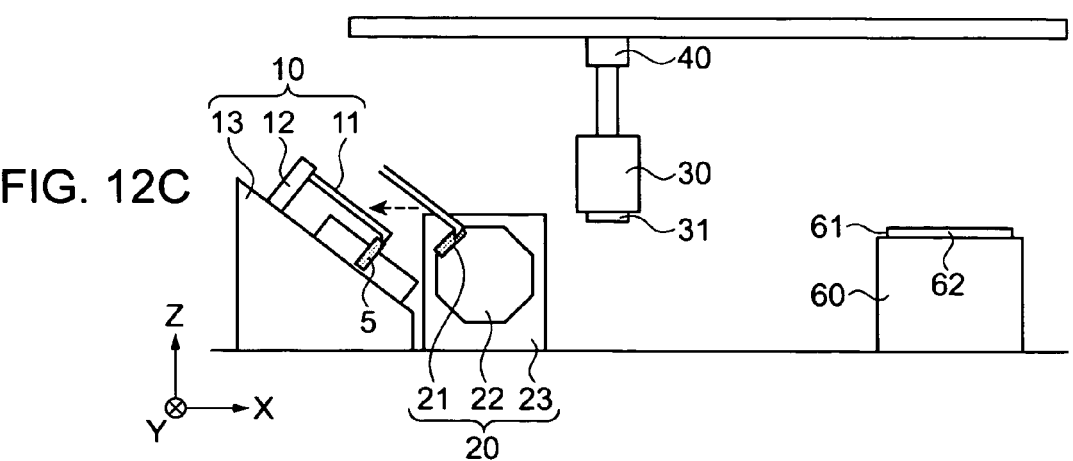
FIG. 12C is a schematic view showing a method of transferring a substrate according to a modification of the invention.

In this modification, first, as shown in FIG. 12A, the substrate holding mechanism 30 moves to the hold position, and holds the glass substrate 5 stored in the substrate storage surface 62 of the palette 61. More specifically, the absorption collect 31 included in the substrate holding mechanism 30 absorbs and holds the glass substrate 5. Next, the substrate holding mechanism 30, which holds the glass substrate 5, moves the hold position, and simultaneously the rotary pocket 20 moves to the fourth position. At that time, the pocket 21 moves to the second position. Subsequently, as shown in FIG. 12B, the absorption collect 31 of the substrate holding mechanism 30 discharges the glass substrate 5, and places the glass substrate 5 in the pocket 21. Next, the pocket 21, in which the glass substrate 5 is placed, moves to the first position, and simultaneously the rotary pocket 20 moves to the third position. In this state, as shown in FIG. 12C, the hand 11 of the substrate transfer mechanism 10 grips the glass substrate 5. Gripping is performed by using a gap between the partition walls 211c of the pocket 21 and causing the grip fingers to grip the end surface of the glass substrate 5. The hand 11, which grips the glass substrate 5, inserts the glass substrate 5 in the substrate storage case 51 along the support groove 52 of the substrate storage case 51, and then opens the glass substrate 5, such that the glass substrate 5 is stored in the substrate storage case 51. According to such processes, the glass substrate 5 can be transferred from the palette 61 to the substrate storage case 51 by using the substrate transfer apparatus 1.

In this modification, the transfer direction of the glass substrate 5 is opposite to the above-described embodiment, but the operations of the respective parts of the substrate transfer apparatus 1 are the same as those in the embodiment, such that the detailed descriptions thereof will be omitted.

Second Modification

The substrate transfer apparatus 1 according to the above-described embodiment transfers the glass substrate 5, but a target to be transferred is not limited thereto. Any object having a substrate shape can be transferred. For example, a quartz substrate, a silicon substrate, and the like can be transferred. Further, as long as the substrate transfer apparatus 1 can transfer by the above-described transfer method, the size of a substrate to be transferred is not particularly limited.

Third Embodiment

In the above-described embodiment, the hand 11 has the grip fingers, and is configured to grip the glass substrate 5. However, any hand can be used as long as it can 'hold' the glass substrate 5. For example, like the absorption collect, a unit for absorbing and holding the glass substrate 5 can be used.

Fourth Embodiment

In the above-described embodiment, the pocket 21 is configured to move between the first position inclined from the horizontal state and the second position in the horizontal state. Alternatively, the second position may be fixed. In this case, it is preferable that the substrate storage case 51 store the glass substrate 5 in a horizontal state, the substrate transfer mechanism 10 holds the glass substrate 5 in the horizontal state, and parallel moves the glass substrate 5 to be placed in the pocket 21. As an example of such a substrate transfer mechanism 10, a substrate transfer mechanism having an absorbing mechanism for absorbing and holding the glass substrate 5 in the horizontal state from the top can be exemplified.

Fifth Embodiment

The above-described embodiment manufactures a transmissive liquid crystal display device 100 by using a pair of glass substrates, but the method of transferring a substrate according to the invention can be applied to the manufacture of various electro-optical devices, such as an LCOS (Liquid Crystal on Silicon) using a silicon substrate with a reflecting film, or the like.

The entire disclosure of Japanese Patent Application No. 2005-094766, filed Mar. 3, 2005, is expressly incorporated by reference herein.

What is claimed is:

1. A substrate transfer apparatus for transferring a substrate held within support grooves in inner walls of a first substrate storage case to a substrate storage surface that is parallel to a horizontal plane of a second substrate storage case, the substrate transfer apparatus comprising:
   a first-substrate-storage-case placement section in which the first substrate storage case is placed with the substrate inclined by a predetermined non-horizontal and non-vertical angle from the horizontal plane;
   a second-substrate-storage-case placement section in which the second substrate storage case is placed;
   a substrate transfer mechanism that draws the substrate out from the first substrate storage case and transfers the substrate;
   a substrate placing mechanism having a substrate placement section that receives the substrate from the substrate transfer mechanism, the substrate placing mechanism having a rotating mechanism that rotates the substrate from the predetermined non-horizontal and non-vertical angle to a substantially horizontal state;
   a substrate holding mechanism that holds, at a hold position, the substrate placed in the substrate placement section and discharges, at a discharge position, the substrate to dispose the substrate on the substrate storage surface of the second substrate storage case; and
   a transport mechanism that transports the substrate holding mechanism from the hold position to the discharge position.

2. The substrate transfer apparatus according to claim 1, wherein the substrate placing mechanism has a moving mechanism that moves the substrate placement section to a plurality of positions including a first position and a second position, and
   the substrates placed in the substrate placement section disposed at the first position are substantially parallel to the substrates stored in the first substrate storage case on the first-substrate-storage-case placement section.

3. The substrate transfer apparatus according to claim 2, wherein the substrates placed in the substrate placement section disposed at the second position are substantially parallel to the substrate storage surfaces included in the second substrate storage case, and the substrate holding mechanism holds, at the hold position, the substrates placed in the substrate placement section disposed at the second position.

4. The substrate transfer apparatus according to claim 2, wherein the moving mechanism has a rotating mechanism that rotates a part including the substrate placement section around a substantially horizontal axis.

5. The substrate transfer apparatus according to claim 1, wherein the substrate holding mechanism has an absorbing mechanism that absorbs and holds the substrates.

6. The substrate transfer apparatus according to claim 5, wherein the substrate holding mechanism has a rotating unit that rotates the absorbing mechanism around a substantially vertical axis.

7. The substrate transfer apparatus according to claim 1, further comprising:
   a first detecting mechanism that detects the direction of the substrate placed in the substrate placement section.

8. The substrate transfer apparatus according to claim 1, further comprising:
   a second detecting mechanism that detects damages of the substrates placed in the substrate placement section.

9. The substrate transfer apparatus according to claim 1, further comprising:
   a third detecting mechanism that detects positions of end surfaces of the substrates held by the substrate holding mechanism;
   a fourth detecting mechanism that detects positions of partition walls of the substrate storage surfaces provided in the second substrate storage case; and
   a processing unit that calculates the discharge positions from the positions of the end surfaces detected by the third detecting mechanism and the positions of the partition walls detected by the fourth detecting mechanism, and transmits information of the discharge positions to the transport mechanism.

10. A method of transferring a substrate stored in support grooves in inner walls of a first substrate storage case to a substrate storage surface that is parallel to a horizontal plane of a second substrate storage case, the method comprising:
    causing a substrate transfer mechanism to draw the substrate out from the first substrate storage case, in which the substrate is inclined by a predetermined non-horizontal and non-vertical angle from the horizontal plane, and to transfer the substrate;
    causing a substrate placement section of a substrate placing mechanism to receive the substrate from the substrate transfer mechanism, the substrate placing mechanism having a rotating mechanism that rotates the substrate from the predetermined non-horizontal and non-vertical angle to a substantially horizontal state;
    causing a substrate holding mechanism to hold, at a hold position, the substrate placed in the substrate placement section;
    causing a transport mechanism to transport the substrate holding mechanism from the hold position to a discharge position; and
    causing the substrate holding mechanism to discharge the substrate at the discharge position and to dispose the substrate on the substrate storage surface of the second substrate storage case, which is placed on a second-substrate-storage-case placement section.

11. A method of manufacturing an electro-optical device by transferring a substrate in support grooves in inner walls of a first substrate storage case to a substrate storage surface that is parallel to a horizontal plane of a second substrate storage case, the method comprising:

causing a substrate transfer mechanism to draw the substrate out from the first substrate storage case, in which the substrate is inclined by a predetermined non-horizontal and non-vertical angle from the horizontal plane, and to transfer the substrate;

causing a substrate placement section of a substrate placing mechanism to receive the substrate from the substrate transfer mechanism, the substrate placing mechanism having a rotating mechanism that rotates the substrate from the predetermined non-horizontal and non-vertical angle to a substantially horizontal state;

causing a substrate holding mechanism to hold, at a hold position, the substrate placed in the substrate placement section;

causing a transport mechanism to transport the substrate holding mechanism from the hold position to a discharge position; and causing the substrate holding mechanism to discharge, at the discharge position, the substrate and to dispose the substrate on the substrate storage surface of the second substrate storage case placed on a second-substrate-storage-case placement section.

* * * * *